US009948644B2

(12) United States Patent
Brouk et al.

(10) Patent No.: US 9,948,644 B2
(45) Date of Patent: Apr. 17, 2018

(54) ROUTING MESSAGES BETWEEN APPLICATIONS

(71) Applicant: salesforce.com, inc., San Francisco, CA (US)

(72) Inventors: Lev Brouk, San Francisco, CA (US); Kenneth Norton, Mill Valley, CA (US); Jason Douglas, San Francisco, CA (US); Peter Panec, Santa Monica, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/805,307

(22) Filed: Jul. 21, 2015

(65) Prior Publication Data

US 2016/0028729 A1    Jan. 28, 2016

Related U.S. Application Data

(63) Continuation of application No. 14/295,230, filed on Jun. 3, 2014, now Pat. No. 9,219,678, which is a continuation of application No. 12/773,779, filed on May 4, 2010, now Pat. No. 8,782,146, and a continuation of application No. 12/773,776, filed on May 4, 2010, now Pat. No. 9,083,601, said application No. 12/773,779 is a continuation of application No. 09/820,964, filed on Mar. 30, 2001, now Pat. No. 7,788,399, said application No. 12/773,776 is a continuation of application No. 09/820,964, filed on Mar. 30, 2001, now Pat. No. 7,788,399.

(60) Provisional application No. 60/278,440, filed on Mar. 26, 2001.

(51) Int. Cl.
*H04L 12/58* (2006.01)
*H04L 29/06* (2006.01)

(52) U.S. Cl.
CPC .......... *H04L 63/0884* (2013.01); *H04L 51/04* (2013.01); *H04L 63/08* (2013.01); *H04L 63/20* (2013.01); *H04L 51/14* (2013.01)

(58) Field of Classification Search
CPC ...... H04L 63/0884; H04L 51/04; H04L 65/40
USPC .......... 726/2, 5, 7, 9, 12; 713/153, 155, 188
See application file for complete search history.

(56) References Cited

U.S. PATENT DOCUMENTS

| 5,119,377 A | 6/1992 | Cobb et al. |
| 5,222,234 A | 6/1993 | Wang et al. |
| 5,255,389 A | 10/1993 | Wang |
| 5,333,312 A | 7/1994 | Wang |
| 5,432,932 A | 7/1995 | Chen et al. |

(Continued)

OTHER PUBLICATIONS

"Oracle Message Broker—Release 2.0.1.0 for SPARC Solaris and Windows NT"—Oracle, Sep. 2000 http://docs.oracle.com/cd/A87860_01/doc/ois.817/a65435.pdf.*

(Continued)

*Primary Examiner* — Randy Scott
(74) *Attorney, Agent, or Firm* — Fenwick & West LLP

(57) ABSTRACT

A system and method for enabling the interchange of enterprise data through an open platform is disclosed. This open platform can be based on a standardized interface that enables parties to easily connect to and use the network. Services operating as senders, recipients, and in-transit parties can therefore leverage a framework that overlays a public network.

20 Claims, 6 Drawing Sheets

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,684,791 A | 11/1997 | Raychaudhuri et al. |
| 5,715,450 A | 2/1998 | Ambrose et al. |
| 5,761,419 A | 6/1998 | Schwartz et al. |
| 5,815,665 A * | 9/1998 | Teper .................. G06Q 20/00 705/26.35 |
| 5,819,038 A | 10/1998 | Carleton et al. |
| 5,821,937 A | 10/1998 | Tonelli et al. |
| 5,831,610 A | 11/1998 | Tonelli et al. |
| 5,850,518 A | 12/1998 | Northrup |
| 5,873,096 A | 2/1999 | Lim et al. |
| 5,903,652 A | 5/1999 | Mital |
| 5,918,159 A | 6/1999 | Fomukong et al. |
| 5,963,953 A | 10/1999 | Cram et al. |
| 5,983,265 A | 11/1999 | Martino, II |
| 6,032,118 A | 2/2000 | Tello et al. |
| 6,055,513 A | 4/2000 | Katz et al. |
| 6,065,082 A | 5/2000 | Blair et al. |
| 6,073,142 A | 6/2000 | Geiger et al. |
| 6,078,959 A | 6/2000 | Wright et al. |
| 6,085,238 A | 7/2000 | Yuasa et al. |
| 6,091,714 A | 7/2000 | Sensel et al. |
| 6,092,083 A | 7/2000 | Brodersen et al. |
| 6,148,411 A | 11/2000 | Ichinohe et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,226,623 B1 | 5/2001 | Schein et al. |
| 6,230,203 B1 | 5/2001 | Koperda et al. |
| 6,233,565 B1 | 5/2001 | Lewis et al. |
| 6,233,617 B1 | 5/2001 | Rothwein et al. |
| 6,256,667 B1 | 7/2001 | Wahlander et al. |
| 6,260,062 B1 | 7/2001 | Davis et al. |
| 6,266,669 B1 | 7/2001 | Brodersen et al. |
| 6,292,789 B1 | 9/2001 | Schutzer |
| 6,295,530 B1 | 9/2001 | Ritchie et al. |
| 6,304,969 B1 | 10/2001 | Wasserman et al. |
| 6,324,568 B1 | 11/2001 | Diec |
| 6,324,693 B1 | 11/2001 | Brodersen et al. |
| 6,332,163 B1 | 12/2001 | Bowman-Amuah |
| 6,336,135 B1 | 1/2002 | Niblett et al. |
| 6,336,137 B1 | 1/2002 | Lee et al. |
| 6,338,050 B1 | 1/2002 | Conklin et al. |
| 6,351,739 B1 | 2/2002 | Egendorf |
| D454,139 S | 3/2002 | Feldcamp |
| 6,367,077 B1 | 4/2002 | Brodersen et al. |
| 6,381,736 B1 | 4/2002 | Klotz et al. |
| 6,385,729 B1 * | 5/2002 | DiGiorgio et al. .... G06Q 20/18 713/172 |
| 6,393,605 B1 | 5/2002 | Loomans |
| 6,397,197 B1 | 5/2002 | Gindlesperger |
| 6,397,254 B1 | 5/2002 | Northrup |
| 6,405,220 B1 | 6/2002 | Brodersen et al. |
| 6,421,705 B1 | 7/2002 | Northrup |
| 6,434,550 B1 | 8/2002 | Warner et al. |
| 6,438,594 B1 | 8/2002 | Bowman-Amuah |
| 6,446,089 B1 | 9/2002 | Brodersen et al. |
| 6,449,634 B1 | 9/2002 | Capiel |
| 6,470,357 B1 | 10/2002 | Garcia et al. |
| 6,470,385 B1 | 10/2002 | Nakashima et al. |
| 6,493,758 B1 | 12/2002 | McLain |
| 6,499,108 B1 | 12/2002 | Johnson |
| 6,502,131 B1 | 12/2002 | Vaid et al. |
| 6,526,044 B1 | 2/2003 | Cookmeyer, II et al. |
| 6,529,489 B1 | 3/2003 | Kikuchi et al. |
| 6,535,909 B1 | 3/2003 | Rust |
| 6,546,413 B1 | 4/2003 | Northrup |
| 6,549,908 B1 | 4/2003 | Loomans |
| 6,549,944 B1 | 4/2003 | Weinberg et al. |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,587,466 B1 | 7/2003 | Bhattacharya et al. |
| 6,587,838 B1 | 7/2003 | Esposito et al. |
| 6,601,082 B1 | 7/2003 | Durham et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,633,630 B1 | 10/2003 | Owens et al. |
| 6,651,087 B1 | 11/2003 | Dennis |
| 6,654,032 B1 | 11/2003 | Zhu et al. |
| 6,665,393 B1 | 12/2003 | Johnson et al. |
| 6,665,648 B2 | 12/2003 | Brodersen et al. |
| 6,665,655 B1 | 12/2003 | Warner et al. |
| 6,671,713 B2 | 12/2003 | Northrup |
| 6,671,746 B1 | 12/2003 | Northrup |
| 6,684,336 B1 | 1/2004 | Banks et al. |
| 6,684,438 B2 | 2/2004 | Brodersen et al. |
| 6,704,768 B1 | 3/2004 | Zombek et al. |
| 6,711,565 B1 | 3/2004 | Subramaniam et al. |
| 6,714,987 B1 | 3/2004 | Amin et al. |
| 6,718,380 B1 | 4/2004 | Mohaban et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,731,741 B1 | 5/2004 | Fourcand et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,735,621 B1 | 5/2004 | Yoakum et al. |
| 6,738,975 B1 * | 5/2004 | Yee .................. G06F 9/541 719/310 |
| 6,754,681 B2 | 6/2004 | Brodersen et al. |
| 6,760,416 B1 | 7/2004 | Banks et al. |
| 6,763,104 B1 | 7/2004 | Judkins et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,785,730 B1 | 8/2004 | Taylor |
| 6,804,330 B1 | 10/2004 | Jones et al. |
| 6,813,278 B1 | 11/2004 | Swartz et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,839,771 B1 | 1/2005 | Bouchier et al. |
| 6,842,748 B1 | 1/2005 | Warner |
| 6,850,895 B2 | 2/2005 | Brodersen et al. |
| 6,850,949 B2 | 2/2005 | Warner et al. |
| 6,857,072 B1 | 2/2005 | Schuster et al. |
| 6,868,406 B1 * | 3/2005 | Ogg ................ G07B 17/00193 705/401 |
| 6,877,023 B1 | 4/2005 | Maffeis et al. |
| 6,886,026 B1 | 4/2005 | Hanson |
| 6,917,962 B1 | 7/2005 | Cannata et al. |
| 6,925,483 B1 | 8/2005 | Niemi |
| 6,925,488 B2 | 8/2005 | Bantz et al. |
| 6,934,532 B2 | 8/2005 | Coppinger et al. |
| 6,948,063 B1 | 9/2005 | Ganesan et al. |
| 6,952,717 B1 | 10/2005 | Monchilovich et al. |
| 6,957,199 B1 | 10/2005 | Fisher |
| 6,965,878 B1 | 11/2005 | Heuring |
| 6,990,513 B2 | 1/2006 | Belfiore et al. |
| 7,028,312 B1 | 4/2006 | Merrick et al. |
| 7,035,202 B2 | 4/2006 | Callon |
| 7,062,502 B1 | 6/2006 | Kesler |
| 7,069,231 B1 | 6/2006 | Cinarkaya et al. |
| 7,082,532 B1 | 7/2006 | Vick et al. |
| 7,088,727 B1 | 8/2006 | Short et al. |
| 7,099,950 B2 | 8/2006 | Jones et al. |
| 7,100,195 B1 | 8/2006 | Underwood |
| 7,127,613 B2 | 10/2006 | Pabla et al. |
| 7,133,863 B2 | 11/2006 | Teng et al. |
| 7,152,204 B2 | 12/2006 | Upton |
| 7,165,110 B2 | 1/2007 | Neal et al. |

(56) References Cited

U.S. PATENT DOCUMENTS

| | | |
|---|---|---|
| 7,181,758 B1 | 2/2007 | Chan |
| 7,225,249 B1 | 5/2007 | Barry et al. |
| 7,228,346 B1 | 6/2007 | Allavarpu et al. |
| 7,249,195 B2 | 7/2007 | Panec |
| 7,286,661 B1 | 10/2007 | Balk et al. |
| 7,289,976 B2 | 10/2007 | Kihneman et al. |
| 7,305,454 B2 | 12/2007 | Reese |
| 7,327,756 B2 | 2/2008 | Hamlin |
| 7,340,411 B2 | 3/2008 | Cook |
| 7,356,482 B2 | 4/2008 | Frankland et al. |
| 7,383,355 B1 | 6/2008 | Berkman et al. |
| 7,401,094 B1 | 7/2008 | Kesler |
| 7,412,455 B2 | 8/2008 | Dillon |
| 7,508,789 B2 | 3/2009 | Chan |
| 7,516,191 B2 | 4/2009 | Brouk et al. |
| 7,590,685 B2 | 9/2009 | Palmeri et al. |
| 7,620,655 B2 | 11/2009 | Larsson et al. |
| 7,689,711 B2 | 3/2010 | Brouk et al. |
| 7,698,160 B2 | 4/2010 | Beaven et al. |
| 7,757,101 B2 * | 7/2010 | Nonaka .................. G06F 21/10 705/51 |
| 7,779,039 B2 | 8/2010 | Weissman et al. |
| 7,921,225 B2 * | 4/2011 | Bonefas ................. H04L 1/1635 709/218 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,260,849 B2 | 9/2012 | Shkvarchuk et al. |
| 8,275,836 B2 | 9/2012 | Beaven et al. |
| 8,457,545 B2 | 6/2013 | Chan |
| 8,484,111 B2 | 7/2013 | Frankland et al. |
| 8,595,293 B2 | 11/2013 | Brouk et al. |
| 2001/0005358 A1 | 6/2001 | Shiozawa |
| 2001/0029478 A1 | 10/2001 | Laster et al. |
| 2001/0044791 A1 | 11/2001 | Richter et al. |
| 2001/0049730 A1 | 12/2001 | Brendes et al. |
| 2002/0010781 A1 | 1/2002 | Tuatini |
| 2002/0013854 A1 | 1/2002 | Eggleston et al. |
| 2002/0019797 A1 | 2/2002 | Stewart et al. |
| 2002/0022986 A1 | 2/2002 | Coker et al. |
| 2002/0026513 A1 | 2/2002 | Hoglund et al. |
| 2002/0029161 A1 | 3/2002 | Brodersen et al. |
| 2002/0029201 A1 | 3/2002 | Barzilai |
| 2002/0029376 A1 | 3/2002 | Ambrose et al. |
| 2002/0031086 A1 | 3/2002 | Welin |
| 2002/0035577 A1 | 3/2002 | Brodersen et al. |
| 2002/0038336 A1 | 3/2002 | Abileah et al. |
| 2002/0042264 A1 | 4/2002 | Kim |
| 2002/0042843 A1 | 4/2002 | Diec |
| 2002/0058277 A1 | 5/2002 | Bathe-Brigitte et al. |
| 2002/0064149 A1 | 5/2002 | Elliott et al. |
| 2002/0067726 A1 | 6/2002 | Ganesh et al. |
| 2002/0072951 A1 | 6/2002 | Lee et al. |
| 2002/0082892 A1 | 6/2002 | Raffel et al. |
| 2002/0087371 A1 | 7/2002 | Abendroth |
| 2002/0091533 A1 | 7/2002 | Ims et al. |
| 2002/0095571 A1 * | 7/2002 | Bradee ................. G06F 21/6218 713/164 |
| 2002/0116501 A1 | 8/2002 | Ho et al. |
| 2002/0120697 A1 | 8/2002 | Generous et al. |
| 2002/0129352 A1 | 9/2002 | Brodersen et al. |
| 2002/0138166 A1 | 9/2002 | Mok et al. |
| 2002/0138553 A1 | 9/2002 | Binder |
| 2002/0140731 A1 | 10/2002 | Subramaniam et al. |
| 2002/0143819 A1 | 10/2002 | Han et al. |
| 2002/0143997 A1 | 10/2002 | Huang et al. |
| 2002/0161611 A1 | 10/2002 | Price et al. |
| 2002/0161688 A1 | 10/2002 | Stewart et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0009385 A1 | 1/2003 | Tucciarone et al. |
| 2003/0014477 A1 | 1/2003 | Oppenheimer et al. |
| 2003/0018705 A1 | 1/2003 | Chen et al. |
| 2003/0018830 A1 | 1/2003 | Chen et al. |
| 2003/0037250 A1 | 2/2003 | Walker et al. |
| 2003/0041178 A1 | 2/2003 | Brouk et al. |
| 2003/0053459 A1 | 3/2003 | Brouk |
| 2003/0058277 A1 | 3/2003 | Bowman-Amuah |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0097447 A1 | 5/2003 | Johnston |
| 2003/0105887 A1 | 6/2003 | Cox et al. |
| 2003/0120675 A1 | 6/2003 | Stauber et al. |
| 2003/0126136 A1 | 7/2003 | Omoigui |
| 2003/0151633 A1 | 8/2003 | George et al. |
| 2003/0159136 A1 | 8/2003 | Huang et al. |
| 2003/0182383 A1 | 9/2003 | He |
| 2003/0187921 A1 | 10/2003 | Diec |
| 2003/0189600 A1 | 10/2003 | Gune et al. |
| 2003/0191816 A1 | 10/2003 | Landress et al. |
| 2003/0200184 A1 | 10/2003 | Dominguez et al. |
| 2003/0204427 A1 | 10/2003 | Gune et al. |
| 2003/0206192 A1 | 11/2003 | Chen et al. |
| 2003/0212738 A1 | 11/2003 | Wookey et al. |
| 2003/0225730 A1 | 12/2003 | Warner et al. |
| 2004/0001092 A1 | 1/2004 | Rothwein et al. |
| 2004/0001514 A1 | 1/2004 | Wookey et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0064511 A1 | 4/2004 | Abdel-Aziz et al. |
| 2004/0078373 A1 | 4/2004 | Ghoneimy et al. |
| 2004/0122730 A1 | 6/2004 | Tucciarone et al. |
| 2004/0128001 A1 | 7/2004 | Levin et al. |
| 2004/0162741 A1 | 8/2004 | Flaxer et al. |
| 2004/0167987 A1 | 8/2004 | Reese |
| 2004/0186860 A1 | 9/2004 | Lee et al. |
| 2004/0186891 A1 | 9/2004 | Panec et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243574 A1 | 12/2004 | Giroux et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005164 A1 | 1/2005 | Syiek et al. |
| 2005/0021850 A1 | 1/2005 | Minyard |
| 2005/0050555 A1 | 3/2005 | Exley et al. |
| 2005/0080914 A1 | 4/2005 | Lerner et al. |
| 2005/0086297 A1 | 4/2005 | Hinks |
| 2005/0091098 A1 | 4/2005 | Brodersen et al. |
| 2005/0166209 A1 | 7/2005 | Merrick et al. |
| 2005/0195955 A1 | 9/2005 | Amano et al. |
| 2005/0223022 A1 | 10/2005 | Weissman et al. |
| 2005/0228863 A1 | 10/2005 | Palmeri et al. |
| 2005/0234928 A1 | 10/2005 | Shkvarchuk et al. |
| 2005/0246278 A1 | 11/2005 | Gerber et al. |
| 2005/0256802 A1 | 11/2005 | Ammermann et al. |
| 2005/0267882 A1 | 12/2005 | Aupperlee et al. |
| 2006/0006224 A1 | 1/2006 | Modi |
| 2006/0021019 A1 | 1/2006 | Hinton et al. |
| 2006/0031225 A1 | 2/2006 | Palmeri et al. |
| 2006/0064380 A1 | 3/2006 | Zukerman |
| 2006/0155871 A1 | 7/2006 | Ilkka et al. |
| 2006/0179058 A1 | 8/2006 | Bram et al. |
| 2007/0022155 A1 | 1/2007 | Owens et al. |
| 2007/0078950 A1 | 4/2007 | Hopkins et al. |
| 2008/0016242 A1 | 1/2008 | Panec et al. |
| 2008/0052775 A1 | 2/2008 | Sandhu et al. |
| 2008/0249972 A1 | 10/2008 | Dillon |
| 2009/0019534 A1 | 1/2009 | Bakshi et al. |
| 2009/0063415 A1 | 3/2009 | Chatfield et al. |
| 2009/0100342 A1 | 4/2009 | Jakobson |
| 2009/0106371 A1 | 4/2009 | Schmidt-Karaca et al. |
| 2009/0177744 A1 | 7/2009 | Marlow et al. |

(56) References Cited

U.S. PATENT DOCUMENTS

| | | |
|---|---|---|
| 2010/0013625 A1 | 1/2010 | Kouzan et al. |
| 2010/0217820 A1 | 8/2010 | Brouk et al. |
| 2010/0218245 A1 | 8/2010 | Brouk et al. |
| 2011/0125854 A1 | 5/2011 | Macken |
| 2011/0218958 A1 | 9/2011 | Warshavsky et al. |
| 2011/0247051 A1 | 10/2011 | Bulumulla et al. |
| 2011/0302414 A1 | 12/2011 | Logan et al. |
| 2012/0042218 A1 | 2/2012 | Cinarkaya et al. |
| 2012/0158834 A1 | 6/2012 | Brouk et al. |
| 2012/0158835 A1 | 6/2012 | Brouk et al. |
| 2012/0324125 A1 | 12/2012 | Brouk et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

OTHER PUBLICATIONS

Non-Final Office Action from U.S. Appl. No. 12/773,779, dated Apr. 15, 2011.
Final Office Action from U.S. Appl. No. 12/773,779, dated Oct. 17, 2011.
Non-Final Office Action from U.S. Appl. No. 12/773,779, dated Jul. 2, 2013.
Final Office Action from U.S. Appl. No. 12/773,779, dated Dec. 10, 2013.
Notice of Allowance from U.S. Appl. No. 12/773,779, dated Mar. 4, 2014.
Non-Final Office Action from U.S. Appl. No. 13/409,047, dated Jul. 13, 2012.
Non-Final Office Action from U.S. Appl. No. 13/409,044, dated Jun. 22, 2012.
Final Office Action from U.S. Appl. No. 13/409,044, dated Mar. 20, 2013.
Non-Final Office Action from U.S. Appl. No. 13/409,044, dated Sep. 4, 2013.
Final Office Action from U.S. Appl. No. 13/409,047, dated Jul. 12, 2013.
Notice of Allowance from U.S. Appl. No. 13/409,047, dated Sep. 27, 2013.
Notice of Allowance from U.S. Appl. No. 13/409,044, dated Jan. 14, 2014.
Non-Final Office Action from U.S. Appl. No. 14/295,230, dated Feb. 10, 2015.
Non-Final Office Action from U.S. Appl. No. 12/773,776, dated Mar. 11, 2013.
Non-Final Office Action from U.S. Appl. No. 12/773,776, dated Jul. 5, 2012.
Advisory Action from U.S. Appl. No. 12/773,776, dated Sep. 17, 2012.
Lang, J., "Oracle Enterprise Messaging Service," Oracle Open World, Features and Overview, Apr. 2010, pp. 1-51, http://www.oracle.com/technetwork/middleware/ias/oracleenterprisemessaging-servicepre-129348.pdf.
Office Action dated Jun. 20, 2005 from U.S. Appl. No. 09/820,966.
Office Action dated Sep. 21, 2004 from U.S. Appl. No. 10/728,356.
Office Action dated Sep. 28, 2005 from U.S. Appl. No. 09/820,965.
Office Action dated Sep. 30, 2005 from U.S. Appl. No. 09/820,966.
Office Action dated Sep. 30, 2005 from U.S. Appl. No. 10/728,356.
Office Action dated Oct. 26, 2004 from U.S. Appl. No. 09/820,965.
Office Action dated Dec. 14, 2004 from U.S. Appl. No. 09/820,966.
Evite.com launches Free web based group activity organizer, PR Newswire, Jul. 1999.
Excite@Home Excites #1 webshots provides users with comprehensive photo capabilities; unveiling "My Photos wherein excite uses can create personal albums, share photos, search photos and order quality prints by Ofoto," Jorgensen, Mr Presswire, Jun. 2000.
Office Action dated Jun. 20, 2007, from U.S. Appl. No. 10/951,405.
IBM Technical Disclosure Bulletin, "Method of Enabling Automated Invocation of Web Services", Issue No. 455, pp. 1-6, Mar. 2002.
Newcomer, "Understanding Web Service", Addison-Wesley, Boston, pp. 1-46, 2002.
Office Action dated Sep. 21, 2004, from U.S. Appl. No. 10/727,089.
Office Action dated Jun. 2, 2005, from U.S. Appl. No. 10/727,089.
Office Action dated Nov. 28, 2005, from U.S. Appl. No. 10/727,089.
Office Action dated Jul. 3, 2006, from U.S. Appl. No. 10/727,089.
Office Action dated Jan. 17, 2007, from U.S. Appl. No. 10/727,089.
Notice of Allowance dated Jun. 29, 2007, from U.S. Appl. No. 10/727,089.
Office Action dated May 24, 2006, from U.S. Appl. No. 10/728,356.
Notice of Allowance dated May 21, 2007, from U.S. Appl. No. 10/728,356.
Office Action dated Apr. 18, 2007, from U.S. Appl. No. 09/820,966.
Office Action dated Aug. 27, 2007, from U.S. Appl. No. 09/820,966.
Office Action dated Jun. 14, 2006, from U.S. Appl. No. 09/820,965.
Office Action dated Dec. 28, 2006, from U.S. Appl. No. 09/820,965.
Office Action dated Jul. 11, 2007, from U.S. Appl. No. 09/820,965.
Office Action dated Nov. 14, 2007, from U.S. Appl. No. 10/858,709.
Office Action dated Dec. 6, 2007, from U.S. Appl. No. 10/808,212.
U.S. Office Action Final dated Aug. 5, 2008 issued in U.S. Appl. No. 10/858,709.
U.S. Office Action dated Nov. 14, 2007 issued in U.S. Appl. No. 10/858,709.
U.S. Office Action dated Jan. 8, 2009 issued in U.S. Appl. No. 10/858,709.
U.S. Office Action dated Jun. 20, 2007 issued in U.S. Appl. No. 10/951,405.
U.S. Office Action Final dated Oct. 15, 2008 issued in U.S. Appl. No. 10/951,405.
U.S. Office Action dated Jun. 9, 2009 issued in U.S. Appl. No. 10/951,405.
U.S. Office Action dated Sep. 21, 2004 issued in U.S. Appl. No. 10/727,089 (now U.S. Pat. No. 7,305,454).
U.S. Office Action dated Jun. 2, 2005 issued in U.S. Appl. No. 10/727,089 (now U.S. Pat. No. 7,305,454).
U.S. Office Action Final dated Nov. 28, 2005 issued in U.S. Appl No. 10/727,089 (now U.S. Pat. No. 7,305,454).
U.S. Office Action dated Jul. 3, 2006 issued in U.S. Appl. No. 10/727,089 (now U.S. Pat. No. 7,305,454).
U.S. Office Action Final dated Jan. 17, 2007 issued in U.S. Appl. No. 10/727,089 (now U.S. Pat. No. 7,305,454).
U.S. Office Notice of Allowance dated Jun. 29, 2007 issued in U.S. Appl. No. 10/727,089 (now U.S. Pat. No. 7,305,454).
U.S. Office Action dated Sep. 21, 2004 issued in U.S. Appl. No. 10/728,356 (now U.S. Pat. No. 7,249,195).
U.S. Office Action dated Jun. 6, 2005 issued in U.S. Appl. No. 10/728,356 (now U.S. Pat. No. 7,249,195).
U.S. Office Action Final dated Sep. 30, 2005 issued in U.S. Appl. No. 10/728,356 (now U.S. Pat. No. 7,249,195).
U.S. Office Action dated May 24, 2006 issued in U.S. Appl. No. 10/728,356 (now U.S. Pat. No. 7,249,195).
U.S. Notice of Allowance dated May 21, 2007 issued in U.S. Appl. No. 10/728,356 (now U.S. Pat. No. 7,249,195).
U.S. Office Action dated Feb. 5, 2008 issued in U.S. Appl. No. 10/820,650.
U.S. Office Action dated Oct. 28, 2008 issued in U.S. Appl. No. 10/820,650.
U.S. Notice of Allowance dated Mar. 13, 2009 issued in U.S. Appl. No. 10/820,650.
U.S. Notice of Allowance dated Jun. 18, 2009 issued in U.S. Appl. No. 10/820,650.
U.S. Office Action dated Dec. 6, 2007 issued in U.S. Appl. No. 10/808,212.
U.S. Office Action Final dated Aug. 7, 2008 issued in U.S. Appl. No. 10/808,212.
U.S. Office Action dated Mar. 13, 2009 issued in U.S. Appl. No. 10/808,212.

(56) References Cited

OTHER PUBLICATIONS

U.S. Office Action dated Dec. 14, 2004 issued in U.S. Appl. No. 09/820,966.
U.S. Office Action Final dated May 19, 2005 issued in U.S. Appl. No. 09/820,966.
U.S. Office Action dated Jun. 20, 2005 issued in U.S. Appl. No. 09/820,966.
U.S. Office Action Final dated Sep. 30, 2005 issued in U.S. Appl. No. 09/820,966.
U.S. Office Action dated Jul. 3, 2006 issued in U.S. Appl. No. 09/820,966.
U.S. Office Action Final dated Apr. 18, 2007 issued in U.S. Appl. No. 09/820,966.
U.S. Office Action dated Aug. 27, 2007 issued in U.S. Appl. No. 09/820,966.
U.S. Office Action Final dated Apr. 16, 2008 issued in U.S. Appl. No. 09/820,966.
U.S. Office Action dated Jan. 9, 2009 issued in U.S. Appl. No. 09/820,966.
U.S. Office Action dated Oct. 26, 2004 issued in U.S. Appl. No. 09/820,965.
U.S. Office Action dated Jun. 6, 2005 issued in U.S. Appl. No. 09/820,965.
U.S. Office Action Final dated Sep. 28, 2005 issued in U.S. Appl. No. 09/820,965.
U.S. Examiners Interview Summary dated Aug. 3, 2005 issued in U.S. Appl. No. 09/820,965.
U.S. Office Action dated Jun. 14, 2006 issued in U.S. Appl. No. 09/820,965.
U.S. Office Action dated Dec. 28, 2006 issued in U.S. Appl. No. 09/820,965.
U.S. Office Action Final dated Jul. 11, 2007 issued in U.S. Appl. No. 09/820,965.
U.S. Examiner Interview Summary dated Oct. 9, 2007 issued in U.S. Appl. No. 09/820,965.
U.S. Office Action dated Dec. 28, 2007 issued in U.S. Appl. No. 09/820,965.
U.S. Notice of Allowance and Examiners Amendment dated Sep. 8, 2008 issued in U.S. Appl. No. 09/820,965.
U.S. Notice of Allowance dated Dec. 18, 2008 issued in U.S. Appl. No. 09/820,965.
U.S. Office Action dated Jan. 22, 2009 issued in U.S. Appl. No. 09/820,965.
U.S. Office Action dated Feb. 3, 2009 issued in U.S. Appl. No. 09/820,965.
U.S Office Action dated Feb. 12, 2009 issued in U.S. Appl. No. 09/820,965.
U.S. Office Action dated Feb. 25, 2009 issued in U.S. Appl. No. 09/820,965.
U.S. Office Action dated Feb. 2, 2009 issued in U.S. Appl. No. 11/016,566.
U.S. Office Action Final dated Jul. 15, 2009 issued in U.S. Appl. No. 11/016,566.
BizTalk Framework Overview (2000) downloaded from Biztalk.org website at http://www.biztalk.org/Biztalk/framework.asp; Retrieved from internet on Nov. 8, 2000, 3 pages.
Coblist:—Cob: Welcome to my photo album! (2000) retrieved from internet at http://www.deatech.com/natural/ coblist/coblist-we/2000/0484.html; dated Sep. 25, 2000, pp. 1-2.
CrossGAIN: A New Foundation for the Web (2000) overview downloaded from Crossgain.com website at http://www.crossgain.com; Retrieved from internet on Sep. 22, 2000, 1 page.
CrossWeave.TM.—Extending the Enterprise (2001), company overview downloaded from CrossWeave.com website at http://www.crossweave.com/company_overview.html; Retrieved from internet on Apr. 1, 2002, 1 page.
ebXML: Creating a Single Global Electronic Market (2000) Oasis UN Cefact, copyright ebXML 2000, ebXML Technical Architecture Team, Oct. 17, 2000, 46 pages.

"Evite.com Launches Free Web-based Group Activity Organizer," retrieved from the Internet at www.proquest.com, PR Newswire, ProQuest Doc. ID: 43258854, Jul. 19, 1999, pp. 1-2.
"Evite Relies on MySQL to Deliver Millions of Invitations," retrieved from www.mysql.com, My SQL, The World's Most Popular Open Source Database, MySQL.com, 1998, 4 pages.
"Evite Tour," Mar. 2001, retrieved from the Internet at http://web/archive.org/web/20010270736l7/www.evite.com/ tour?printAll+ok, Evite Mar. 2001, pp. 1-9.
"Excite@Home: Excite's #1 webshots provides users with comprehensive photo capabilities; Unveiling "My Photos" where Excite users can create personal albums, share photos, search photos and order quality prints by Ofoto," [Retrieved from internet at www.proquest.com, on May 24, 2005] ProQuest Doc. ID: 54811626, Jorgensen, M2 Presswire, Coventry: Jun. 5, 2000, 3 pages.
Festa, Paul (2000) "Start-up gains Netscape funding, Microsoft engineers,"CNET News.com, dated Sep. 10, 2000 downloaded from CNET.com website at http://news.com.com/2100-1017-245521.html; Retrieved from internet on Apr. 1, 2002, 2 pages.
GlueCode: Our Mission and Vision (2002) downloaded from Gluecode.com website at URL:http://www.gluecode.com/company/mission_vision.html, p. 1 Retrieved from internet on Apr. 1, 2002, 1 page.
Gluecode.TM. (2000), Company overview and product guide downloaded from Glucode.com website at http://www.glucode.com; Retrieved from internet on Sep. 22, 2000, 18 pages.
Grand, Mark (1993) MIME Overview, downloaded from Mindspring.com website at http://www.mindspring.com/.about.mgrand/mime.html; Revised Oct. 26, 1993; Retrieved from internet on Mar. 1, 2001, 13 pages.
Greef, Arthur (1998) "Partner Interface Process Technical Architecture," RosettaNet/PIP Technical Architecture.doc dated Apr. 1, 2002, pp. 1-12.
Greenbaum, Joshua (2000) "Next Generation E-Business Trading Networks: Intelligent Hubs and Viquity's Nexus Solution," Enterprise Applications Consulting, Berkeley, CA (www.eaconsult.com), pp. 1-20.
ipo.com—Venture Portfolio Company Profile (2002), downloaded from ipo.com website at http://www.ipo.com/venture/ pcprofile.asp?p=IPO&pc=20323; Retrieved from internet on Apr. 1, 2002, 1 page.
Laquey, Robert E. (1999), "SML: Simplifying XML," retrieved from Internet at www.XML.com, dated Nov. 24, 1999, pp. 1-6.
McGregor, Carolyn (Jun. 2003), "A Method to extend BPEL4WS to enable Business Performance Measurement", Center for Advanced Systems Engineering University of Western Sydney, Australia, pp. 1-7.
Newcomer, "Understanding Web Service," Addison-Wesley, Boston, pp. 1-46, 2002.
Peltz, Chris (Jan. 2003), "Web Services Orchestration—A Review of Emerging Technologies, Tools, and Standards", Hewlett-Packard Co., pp. 1-20.
Peltz, Chris (Jul. 2003), "Web Service Orchestration and Choreography—A look at WSCI and BPEL4WS", www.wsj2.com, pp. 1-5.
Slam Dunk Networks (2000), Company overview and product guide downloaded from Slamdunknetworks.com website at http://www.slamdunknetworks.com; Retrieved from internet on Sep. 22, 2000, 15 pages.
Slam Dunk Networks.sup.SM: A global Infrastructure for the Guaranteed Delivery of B2B Transactions over the Internet, Copyright 2000 Slam Dunk Networks, Inc., 19 pages.
Stross, Kenner (2000) "Managed B2B Infrastructure Technical Architecture," Jul. 31, 2000, Transactplus.TM. business quality internet, Transact Technical Architecture, pp. 1-14.
"Trails.com Teams Up With Evite to Offer Email Trip Planning Service," retrieved from Internet at www.trails.com, Homes, 2000.
TransactPlus Network (2000), Company overview and product guide downloaded from TransactPlus.com website at http://www.transactplus.com; Retrieved from internet on Sep. 22, 2000, 13 pages.
Viquity Dynamic Commerce Network.TM. (DCN) (2000), Company Overview and Service Description downloaded from Viquity.

(56) References Cited

OTHER PUBLICATIONS com website at http://www.viquity.com/solutions/architecture.html; Retrieved from internet on Sep. 22, 2000, 2 pages.
Viquity Press Release (2000) "Viquity Demonstrates Power of Hub Technology in ebXML Proof-of-Concept," dated Dec. 12, 2000, downloaded from Viquity.com website at http://www.viquity.com/news.sub.--events/pr.sub.-- detail.asp; Retrieved from internet on Apr. 1, 2002, 2 pages.
U.S. Office Action Final dated Aug. 19, 2009 issued in U.S. Appl. No. 10/858,709.
U.S. Office Action dated Feb. 5, 2010 issued in U.S. Appl. No. 10/858,709.
U.S. Office Action Final dated Feb. 25, 2010 issued in U.S. Appl. No. 10/951,405.
U.S. Notice of Allowance dated Sep. 21, 2009 issued in U.S. Appl. No. 10/808,212.
U.S. Supplemental Notice of Allowability and Examiner Interview Summary dated Dec. 2, 2009 issued in U.S. Appl. No. 10/808,212.
U.S. Notice of Allowance dated Feb. 5, 2010 issued in U.S. Appl. No. 10/808,212.
U.S. Notice of Allowance dated Nov. 16, 2009 issued in U.S. Appl. No. 09/820,966.
U.S. Notice of Allowance dated Dec. 24, 2009 issued in U.S. Appl. No. 11/016,566.
"Evite Tour," Evite, Mar. 2001.
"Trails.com Teams Up With Evite to Offer Email Trip Planning Service," Homes, 2000.
"Evite Relies on MySQL to Deliver Millions of Invitations," Morelock.
"Coblist:—Cob: Welcome to my photo album!," Sep. 2000.
Office Action dated May 19, 2005 from U.S. Appl. No. 09/820,966.
Office Action dated Jun. 6, 2005 from U.S. Appl. No. 09/820,965.
Office Action dated Jun. 6, 2005 from U.S. Appl. No. 10/728,356.
Greef, Arthur, "Partner Interface Process Technical Architecture", (1998), RosettaNet/PIP Technical Architecture.doc, pp. 1-12.
Stross, Kenner, "Managed B2B Infrastructure Technical Architecture", (Jul. 31, 2000), Transact Technical Architecture, pp. 1-14.
"A Global Infrastructure for the Guaranteed Delivery of B2B Transactions over the Internet" (2000), Slam Dunk Networks, pp. 1-18.
ipo.com—Venture, Internet Document, URL:http://ww.ipo.com/venture/pcprofile.asp?p=IPO&pc=20323, p. 1, Apr. 1, 2002.
CrossWeave Company, Internet Document, (2001), URL:http://www.crossweave.com/company_overview.html, p. 1, 2001.
GlueCode/Our Mission and Vision, Internet Document, URL:http://www.gluecode.com/company/mission_vision.html, p. 1, Apr. 1, 2002.
Viquity / Press Release, "Viquity Demonstrates Power of Hub Technology in ebXML Proof-of-Concept", (Dec. 12, 2000), pp. 1-2.
Festa, Paul, "Start-up gains Netscape funding, Microsoft engineers," NET News.com, (Sep. 10, 2000), pp. 1-2.
"Internet Control Message Protocol," McGraw Hill, Inc., Sep. 2000, may be retrieved at URL:<http://medusa.sdsu.edu/network/CS576/Lecture/ch09_ICMP.pdf>.
United States Office Action, U.S. Appl. No. 14/295,230, dated May 29, 2015, 9 pages.
United States Office Action, U.S. Appl. No. 14/295,230, dated Feb. 10, 2015, 9 pages.
United States Office Action, U.S. Appl. No. 12/773,776, dated Jan. 31, 2014, 17 pages.
United States Office Action, U.S. Appl. No. 12/773,776, dated Jul. 5, 2013, 12 pages.
United States Office Action, U.S. Appl. No. 12/773,776, dated Mar. 11, 2013, 12 pages.
United States Office Action, U.S. Appl. No. 12/773,776, dated Jul. 5, 2012, 13 pages.
United States Office Action, U.S. Appl. No. 12/773,776, dated Dec. 8, 2011, 11 pages.
United States Advisory Action, U.S. Appl. No. 12/773,776, dated Sep. 17, 2012, 3 pages.
United States Office Action, U.S. Appl. No. 12/773,779, dated Dec. 10, 2013, 19 pages.
United States Office Action, U.S. Appl. No. 12/773,779, dated Jul. 2, 2013, 16 pages.
United States Office Action, U.S. Appl. No. 12/773,779, dated Oct. 17, 2011, 9 pages.
United States Office Action, U.S. Appl. No. 12/773,779, dated Apr. 15, 2011, 8 pages.
United States Advisory Action, U.S. Appl. No. 09/820,964, dated Sep. 20, 2007, 3 pages.
United States Advisory Action, U.S. Appl. No. 09/820,964, dated Nov. 20, 2006, 3 pages.
United States Advisory Action, U.S. Appl. No. 09/820,964, dated Sep. 20, 2005, 3 pages.
United States Office Action, U.S. Appl. No. 09/820,964, dated Nov. 12, 2009, 18 pages.
United States Office Action, U.S. Appl. No. 09/820,964, dated Mar. 30, 2009, 16 pages.
United States Office Action, U.S. Appl. No. 09/820,964, dated Sep. 3, 2008, 12 pages.
United States Office Action, U.S. Appl. No. 09/820,964, dated Dec. 27, 2007, 12 pages.
United States Office Action, U.S. Appl. No. 09/820,964, dated Jul. 10, 2007, 17 pages.
United States Office Action, U.S. Appl. No. 09/820,964, dated Jan. 25, 2007, 14 pages.
United States Office Action, U.S. Appl. No. 09/820,964, dated Jun. 27, 2006, 14 pages.
United States Office Action, U.S. Appl. No. 09/820,964, dated Dec. 28, 2005, 12 pages.
United States Office Action, U.S. Appl. No. 09/820,964, dated Jul. 13, 2005, 12 pages.
United States Office Action, U.S. Appl. No. 09/820,964, dated Feb. 9, 2005, 11 pages.
Abstract of Jenkins, R., "Why Web-Based Network Monitoring? Leveraging the Platform," International Journal of Network Management, May 1999, 2 pages, vol. 9, Issue 3, [Online] [Retrieved on Mar. 11, 2016] Retrieved from the Internet<URL:http://onlinelibrary.wiley.com/doi/10.1002/(SICI)1099-1190(199905/06)9L3%3C175::AID-NEM320%3E3.0.CO;2-3/abstract>.
Redlich, et al., "Virtual Networks in the Internet," NEC, IEEE, Oct. 1999, pp. 108-114, May be Retrieved at<URL:http://www2.informatik.huberlin.de/~redlich/publication/vitual_networks_in_the_internet.pdf>.
United States Office Action, U.S. Appl. No. 14/805,304, dated May 27, 2016, 8 pages.
Jenkins, R., "Why Web-Based Network Monitoring?" International Journal of Network Management, May 1999, pp. 175-183, vol. 9, Issue 3, May be Retrieved at<URL:http://dpnm.postech.ac.kr/research/02/xgems/refpaper/WBNMpaper/.

\* cited by examiner

ROUTING MESSAGES BETWEEN APPLICATIONS

CROSS-REFERENCE TO RELATED APPLICATIONS

This application is a continuation of U.S. application Ser. No. 14/295,230, filed Jun. 3, 2014, which is a continuation of U.S. application Ser. No. 12/773,776, filed May 4, 2010, and a continuation of U.S. application Ser. No. 12/773,779, filed May 4, 2010, which are both continuations of U.S. application Ser. No. 09/820,964, filed Mar. 30, 2001, which claims the benefit of U.S. Provisional Application No. 60/278,440, filed Mar. 26, 2001. Each of these applications is hereby incorporated herein by reference.

BACKGROUND

Field of the Embodiments

The present invention relates to a system and method for message routing. More specifically, the present invention relates to a message routing network for routing messages between applications.

Description of the Related Art

Corporate reliance on technology has become more complex and more pervasive. Increasingly, companies are identifying opportunities to extend their core business or cut costs using the Internet. Both trends have put increasing priority on integrating disparate business applications. For this reason, enterprise application integration (EAI) has emerged as a solution for allowing information technology departments to build bridges that are designed to unify their legacy systems into a single enterprise application. Ideally, the creation of this single enterprise application would not require sweeping changes to the underlying structures.

EAI suppliers can be viewed in four categories, by decreasing level of application independence: business process level integrators, process flow automation, data integration tools and data transport. Business process EAI offers a number of advantages over traditional middleware solutions for integrating enterprises. First, business process EAI is alleged to be application independent, allowing it to be used in any heterogeneous environment with a greater degree of reuse. Second, at its higher level of abstraction, business process EAI does not require users and implementers to have a detailed knowledge of each of the underlying technologies.

As many EAI vendors have experienced, the practice of releasing customized connectors (or adapters) for each specific enterprise software package has not proven to be scalable. Scores of adapters need to be built for each vendor (e.g., Oracle, SAP and Peoplesoft). As each supplier releases new versions of their software, EAI vendors find themselves unable to gain fraction under the burden of supporting their existing adapters.

Notwithstanding the benefits of EAI, the software costs and resource investments of EAI prevent small-to-medium enterprise (SME) customers from embracing EAI solutions. For SMEs, reliance on application service providers (ASPs) represents an increasingly attractive alternative.

The ASP market is one of the fastest growing segments of the software industry. ASPs make enterprise applications (e.g., human resources administration, recruiting, travel and expense management, sales force automation) available to customers on a subscription basis. Those applications are fully managed and hosted by the ASP, providing significant cost savings to enterprises.

Some ASPs merely host and manage third-party packaged software for their customers ("managed hosters"). Others build new applications from the ground up to take advantage of the benefits and cost-savings of the Web ("webware providers"). Webware providers enjoy the profit margins and operational scalability of consumer Web companies like eBay and Yahoo, while at the same time offering the feature sets of complex enterprise software applications such as Peoplesoft and Siebel.

SUMMARY

In accordance with the present invention, the interchange of enterprise data is supported through an open platform. This open platform can be based on a standardized interface that enables services to easily connect to and use the message interchange network. Services operating as senders, recipients, and in-transit parties can therefore leverage a framework that overlays a public network.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION

An embodiment of the invention is discussed in detail below. While specific implementations are discussed, it should be understood that this is done for illustration purposes only. A person skilled in the relevant art will recognize that other components and configurations may be used without departing from the spirit and scope of the invention.

In accordance with the present invention, the interchange of enterprise data is supported through an open platform for enterprise application integration (EAI). This open platform overlays a public network (e.g., the Internet) and does not require business entities to heavily invest in specialized software and resources. As will be described in greater detail below, the present invention enables the provision of extra-enterprise application integration as a service. This service facilitates EAI efficiently and affordably to the businesses that need it the most (i.e., the small- and medium-sized enterprise (SME) market). More generally, the open platform of the present invention can be used to support services provided by business-to-business (B2B) enablers, system integrators, and other node enablers.

Figure 1:
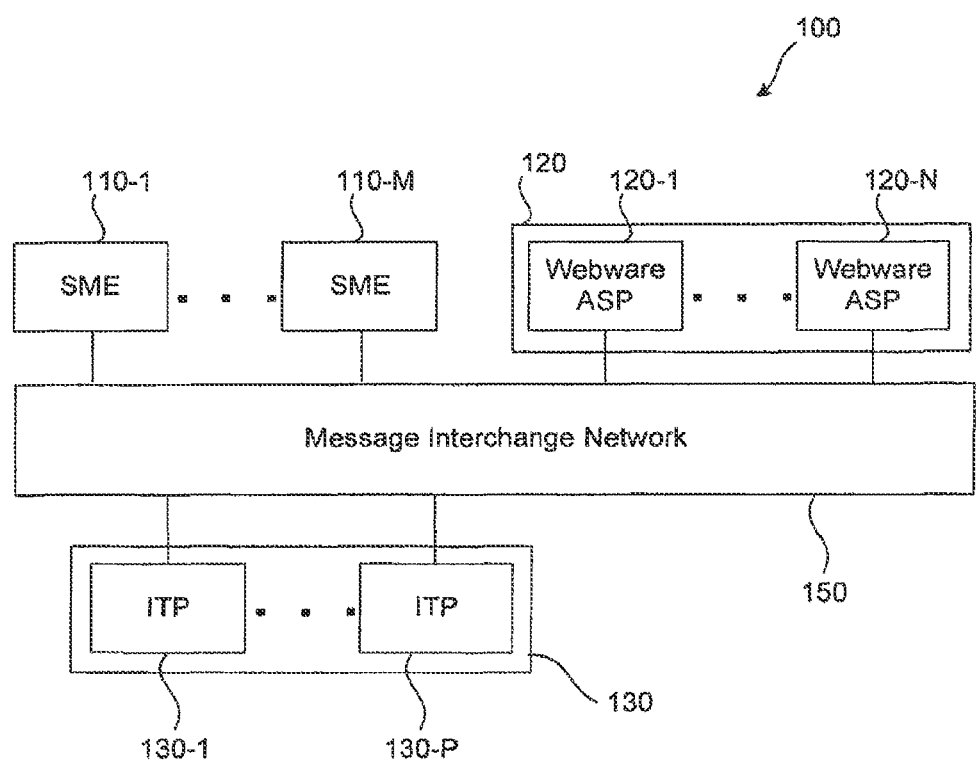
FIG. 1 illustrates a message exchange network.

FIG. 1 illustrates a high-level overview of a message interchange system 100 according to the present invention. Message interchange system 100 includes a message interchange network 150 that enables SMEs 11 O-m, webware ASPs 120-n, and in-transit processors (ITPs) 130-p to connect to one another, integrate business processes and applications, and exchange data for mission-critical business functions. In general, ITPs 130-p are operative to process messages that are in-transit from a sender to a recipient. ITPs 130-p can be designed to perform a variety of functions such as data transformation, enrichment, cross-reference ID mapping, filtering, credit scoring, or the like.

A directory (not shown) includes a list of all SMEs 110-*m*, web ware ASPs 120-*n* and ITPs 130-*p* that can be accessed via message interchange network 150. Only publicly available services (i.e., those services that organizations register as accessible by any user of the network) are viewable in the directory.

In general, all applications that are connected to message interchange network 150 can be referred to as a service. In the illustrated embodiment of FIG. 1, applications owned by SMEs 110-*m*, webware ASPs 120-*n* and ITPs 130-*p* can each be referred to as services. Each service is owned by an organization, and an organization can have any number of services connected to message interchange network 150. The message exchange within message interchange network 150 is therefore between services.

In one embodiment, services that receive messages can take a set of arguments that further define the intended action the service will perform on a received message. For example, a service may receive the name of an operation, or may permit configuration parameters. In this environment, the service would provide a means (e.g., through a URL to documentation) for message composers to know about arguments accepted by the particular service. The message composer can then include selected arguments as a part of the service declaration in a message.

As described, services registered with message interchange network 150 represent applications that send or receive messages. An organization may, however, wish to create virtual services which act as proxies to other services. For example, a business X may have a relationship with business Y such that messages sent to business X's service are redirected to business V's service. Services can implement redirection through routing scripts that map invocations of the service to invocations of another service, including redirection of replies.

For each service registered by an organization with message interchange network 150, there are a number of properties and permissions that can be associated with the service. Examples include a unique service identifier, authentication information, mode of message delivery, windows of time during which messages are accepted, URL address of service, permission to invoke other services to act on a message, and rules that modify the invocation of services. These properties and permissions affect the routing of messages from or to the service.

Figure 2:
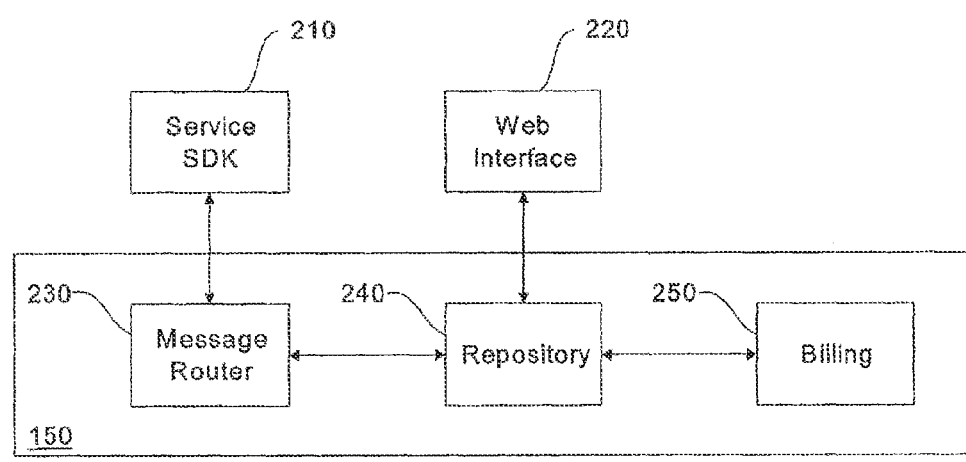
FIG. 2 illustrates components in a message exchange network.

FIG. 2 illustrates the primary functional components that operate within message interchange system 100. The five primary functional components include service software development kit (SDK) component 210, web interface component 220, message router component 230, repository component 240, and billing component 250.

SDK component 210 serves as a foundation for supported development of client applications that interface with message interchange network 150. Owning organizations can use SDK component 210 for custom integration with their software applications. As would be appreciated, SDK component 210 is not required to enable a service to access message interchange network 150. A service can use any development tool or process that would enable the service to leverage the application programming interface (API) that is supported by message router component 230.

In general, SDK component 210 enables the provision of an interface that would be available on most common platforms, and in most popular languages. In this manner, SDK component 210 abstracts away the complex technical requirements of transferring messages using message interchange network 150.

It is a feature of the present invention that SDK component 210 need not have any business logic built into it. SDK component 210 can be used to develop plug-ins to shrink-wrapped applications, thereby greatly reducing development time. As would be appreciated, SDK component 210 can provide convenient libraries and utilities that a service may optionally use to facilitate the (1) creation and reading of messages conforming to the message router component API, and (2) authentication of users of message interchange network 150.

Repository component 240 is the primary database of message interchange network 150. Repository component 240 includes information on customer profiles, message logs, and directories. As will be described in greater detail below, message router component 230 uses repository component 240 to retrieve customer and application information that affects message routing. Message router component 230 also writes message log information to repository component 240 about messages that are processed through message interchange network 150.

Billing component 250 uses the message log information in repository component 240 to derive actual usage of message interchange network 150 by customers, and handles the invoicing and payment collection from customers. It is a feature of the present invention that the billing within message interchange system 100 can be based upon actual customer usage of message interchange network 150. For example, billing component 250 can charge customers based on a per transaction basis. In one embodiment, the per-transaction cost is based on the size of the messages being processed. As would be appreciated, these per transaction costs can be assessed to parties in a variety of ways. For example, the costs can be assessed against the originator of the message, the intermediate services, the recipient of the message, or any combination of those parties. This billing flexibility is in sharp contrast to conventional EAI solutions that generate revenue through software license fees.

Web interface component 220 is the front-end component of message interchange network 150. Web interface component 220 interfaces directly with users by enabling login, registration, account maintenance, directory lookup, rules configuration, reporting, billing, and customer support functionality. The web interface provides online forms for data entry and can perform preliminary validations on the data. Through web interface component 220, the user can also perform queries against repository component 240 for directory lookups or reporting.

It is a feature of the present invention that message interchange network 150 is an open network architecture that not only facilitates the easy introduction of services into the network, but also enables businesses to access a robust suite of services via one connection to the message interchange network 150.

As noted, message router component 230 provides the core function of message routing and delivery within message interchange network 150. In one embodiment, message router component 230 is implemented as an Internet-based message exchange service that provides a transport level messaging service. In other words, message router component 230 need not be aware of the application semantics of a message exchange.

Thus, it is a feature of the present invention that message interchange network 150 need not inherently provide business process modeling. This is in contrast to conventional EAI solutions that may require a continual traversal up and down a protocol stack in routing a message from a sending service to a recipient service. For example, if the protocol stack included transport, routing, transformation, and work flow layers, then each message exchange segment may require analysis and processing at each layer to determine the next service (intermediate or final) that should receive the message.

As noted, services can post messages to and retrieve messages from message router component 230 using an API. This provision of a standardized interface enables parties to easily connect to and use message interchange network 150 without being restricted in the type of message content.

In one embodiment, the protocol for posting and retrieving messages with message interchange network 150 is the Simple Object Access Protocol (SOAP). The SOAP messaging protocol defines a mechanism to pass commands and parameters between HTTP clients and servers. Through this standard object invocation protocol, HTTP is used for transport and XML is used for data encoding. The SOAP messaging protocol does not rely on the use of particular operating systems, programming languages, or object models on either the server side or the client side. As would be appreciated, other protocols can also be supported by message interchange network 150.

It is a feature of the present invention that while the message header uses extensible markup language (XML) syntax, the message body can accommodate any type of data, whether it be text or binary, encrypted or unencrypted. If the message body is also in XML form, then the message body can opt to use a schema based on an industry standard such as ebXML, BizTalk, RosettaNet, OAGIS, or any other suitable standard.

In one embodiment, message exchange through message interchange network 150 is asynchronous. Recipient services can be configured to poll message interchange network 150 for incoming messages, or, if they have their own server, can have message interchange network 150 push messages to them.

After a sending service posts a message to message interchange network 150, one or more in-transit services 130-$p$ can operate on the message before it reaches the recipient service. In-transit services can perform useful operations on messages, such as data transformation, enrichment, cross-reference ID mapping, filtering, credit scoring, or the like. Through the standardized interface, in-transit services 130-$p$ can independently join the message interchange network 150 and operate on messages. This flexibility encourages independent third parties to build services that can be plugged into message interchange network 150. It is a feature of the present invention that such an open network would encourage third parties to market a data service that generates revenue based upon the level of utilization of the service.

As noted, in-transit services can be included in a message path that begins at a sending service and terminates at a recipient service. As will be described in greater detail below, sending services can explicitly specify a set of services to operate on a given message. In addition, recipient services can specify services that should operate on messages before delivery to the recipient service. In one example, a recipient may always want messages to pass through a filtering service to screen out messages from unknown senders.

Messaging through message interchange network 150 can be as secure as the participants desire. Each service registered with message interchange network 150 can specify a security policy declaring encryption and authentication levels for message interchange network 150 to enforce. For messages that flow through in-transit services, a sender can also specify the permissions for each in-transit service to access or operate on parts of the message.

In one embodiment, message interchange network 150 uses the secure HTTPS protocol to support secure transport connections when a service posts a message or polls for messages, and when message interchange network 150 pushes messages to a client server. Authentication can be based on either username/password or certificates.

SSL encryption as part of HTTP can be used to provide data protection during message transmission over the public Internet. In general, this level of protection is sufficient for most situations. Services can, however, perform their own extra encryption of message documents to keep them private even from message interchange network 150. Services that add extra encryption should ensure, however, that all services that operate on the message documents have the necessary keys to decrypt the documents.

As is well known, the authentication protocol of SSL includes a server's presentation of a certificate to clients. Accordingly, message interchange network 150 presents a server certificate to services that connect for posting or polling. The connecting service has the option of then providing either a username/password or certificate for message interchange network 150 to authenticate the service. The form of client authentication is a configuration option within the profile message interchange network 150 maintains for each service.

When message interchange network 150 pushes messages to a service, the service's server should present a server certificate to message interchange network 150 for authentication of the service. For the reverse authentication, the service can then require either a username/password or certificate from message interchange network 150. Again, that option can be configured in the profile information message interchange network 150 maintains for the service.

As a message flows through a selection of services on the way to the recipient service, and as the recipient service's response returns to the sending service, message interchange network 150 maintains an audit trail of all operations on the message and all services that touched the message. The audit trail serves several purposes. First, it enables message interchange network 150 to reconstruct the message history in the case of queries on the message trail. Second, it allows message interchange network 150 to compile a usage report for any service for reporting and billing purposes.

Figure 3:
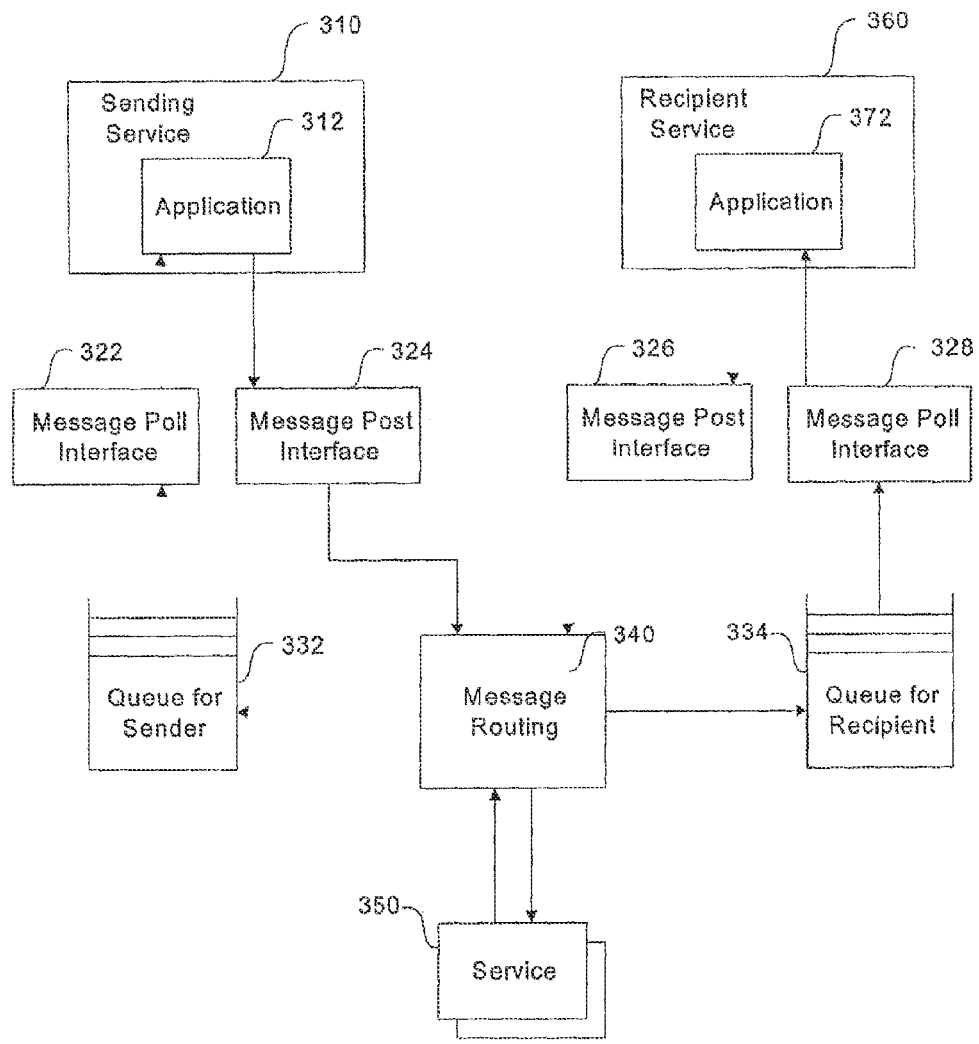
FIG. 3 illustrates a request response pattern.

Having described the general framework of message interchange network 150, a more detailed description of a message transaction lifecycle within message interchange network 150 is provided with reference to FIG. 3.

In this framework, a message can be embodied as a self-contained collection of information to serve a particular purpose, such as a request, a response, a notification, or an acknowledgement. As noted, message interchange network 150 can generally be agnostic about the content of a message other than header information that affects routing of the message.

In one embodiment, request, response, and notification messages can be defined. A request message expects a subsequent response message from the recipient(s) to be returned to the sender. Request messages may represent inquiries, but might also represent update requests that only expect a return status response. If an error occurs in routing a request message, message interchange network 150 returns an error response message to the sender.

A response message is issued by a recipient of a request message. The response message references the original request message. Failure of the response message may result in an error response message being returned to the sender of the original request message.

A notification message is a one-way message. No response to the notification message is expected back to the sender. Message interchange network 150 can regard any response message referencing a notification message as an invalid message. If a notification message fails, no error message is returned to the sender.

As would be appreciated, further messages can be defined for message interchange network 150. For example, a cancel message can also be defined, wherein the cancel message is used by the sender to cancel a previous message.

The operation of these messages is now described with reference to the request/response illustration of FIG. 3. This illustration demonstrates a typical example of a sending service 310, such as an enterprise, making an inquiry to a recipient service 360, such as a webware provider. In one embodiment, a sender's application 312 that connects to message interchange network 150 is a desktop application. In another embodiment, a sender's application 312 that connects to message interchange network 150 is an enterprise server, or an EAI package.

The first step in the message transaction process is the creation of a message. In one embodiment, a sender formats the messages to conform to an XML schema for messages. This XML schema prescribes the format for message headers while allowing any kind of data to be included in the message body (or payload). As part of message construction, sending service 310 specifies the recipient service(s) 360 of the message. In one embodiment, a recipient service's name includes an organization and a specific service provided by that organization. The service name can be generally represented in the message via a globally unique ID.

The actual set of elements contained in a message depend on whether the message is being posted or delivered. In one embodiment, a message includes a header element, a body element and/or attachments. In one embodiment, the attachments are based on multi-part Multipurpose Internet Mail Extensions (MIME).

An embodiment of a message that includes header and body elements is included in Appendix A. In this example, the cardinality of elements is indicated as '?' or {0:1} for an optional instance; , *, or {O:N} for zero or more instances; and '+' or {I:N} for one or more instances. No symbol or {I} represents a required single instance. As would be appreciated, the actual message format can differ depending on the protocol. In particular, protocols other than the SOAP protocol can be used.

The header element includes routing and invocation information. The header as posted by a sending service is often modified by message interchange network 150 for delivery to the receiving service.

The body element includes the documents the sender is sending to the recipient(s). These documents can also be operated upon by one or more services. As noted, the documents can be in the form of XML or any other representation, including text, binary, etc. In one embodiment, all or part of the documents that are being sent are included in an attachment to the message.

While messages will typically have a similar overall structure, the actual composition of elements can differ between the various message types and between messages as posted and as delivered. For example, some elements in a sent message can be changed or not be included in the message as delivered, such as elements particular to constructing a route. Some elements can also be inserted only in the message as delivered, such as identifier elements.

If the sending service wishes to have the message routed through any services before delivery to the recipient service (s), the sending service can specify an explicit sequence of services that should operate on the message. The sender can also implicitly include services in the route for a message through the specification of routing scripts associated with the defining service. Routing scripts are described in greater detail below.

After a message is constructed, the message is posted to message interchange network 150. This process is illustrated in FIG. 3 as the posting of a message by application 312 to message post interface 324. As noted, in one embodiment, the posting of a message is performed using the SOAP messaging protocol.

If sending service 310 posts a message that does not have well-formed XML, the message posting is rejected and an error response is returned. In general, messages can be rejected for a variety of other reasons. For example, a message can be rejected if the service indicated in the message header as the sender is not the same as the actual sender of the message, the message is a duplicate posting of a previous message, a service attempts to reply to a message for which it was not a recipient, or a response message does not reference a prior message.

In one embodiment, each message posted by a service can have a unique handle assigned by the service to identify the message. This unique handle can be used to provide a means for message interchange network 150 to detect duplicate postings of the same message. Duplicate postings can occur in the case of failure recovery by the service. In one embodiment, if a service desires that message interchange network 150 should reject duplicate postings of a message, then the service could provide unique handles for messages and set a "potential duplicate" flag in messages that may be a duplicate posting. It should be noted that regardless of whether or not a service provides a unique handle for a message, message interchange network 150 can assign a globally unique session identifier to each posted message.

After a message is posted, message interchange network 150 routes the message to the recipient service(s) 360. The routing of the message is based upon a route calculation by message interchange network 150. The calculated route includes all intermediary services 350 that are scheduled to operate on the message en route to recipient service(s) 360. The calculated route can be based on routing instructions specified explicitly in the message header and/or on routing scripts pre-defined by the sending service 310, recipient service 360, or any in-transit services 350 that have been included within the calculated route.

In general, routing scripts define a procedure for enabling determination of at least part of a route. This procedure can be based on any type of criteria. For example, a procedure can be defined that determines a next destination of a message based on the existence of one or more attributes of the message. In another example, a procedure can be defined that effects a determination based on the comparison of one or more attributes of the message to a reference value. In yet another example, a procedure can be defined that effects a determination based on pattern matching (e.g., regular expression matching). As would be appreciated, routing scripts can embody any of a variety of criteria-based procedures.

Routing scripts can specify a sequence of services that operate on either inbound or outbound messages for a service. As noted, in-transit services may themselves have routing scripts requiring processing by other services. Therefore, the route calculation can be recursively defined based upon routing scripts specified by all services that interact with the message.

In one example, the sending service 310 may specify a routing script that requires a cross-reference mapping service to be included in the calculated route whenever sending service 310 sends a message to recipient service 360. In another example, recipient service 360 may specify a routing script that requires that any incoming request messages must first pass through a filter service to block messages from a list of sending services 310.

Routing scripts enable sending services to include services into the message route without having to explicitly specify the services in the message itself. Also, routing scripts enable recipient services 360 to require services 350 to be in the calculated route, regardless of the sending service's route specification.

In one embodiment, a routing script is embodied as a routing rule. A routing rule includes two parts: a condition and one or more resultant actions. The conditional part of a rule can be based on any elements or element attributes in a message's header. Additionally, content-based routing can be supported through conditional rules based on attributes of an element in a message's body and/or attachments.

Every rule should have at least one condition. Conditions include an operator and zero or more operands. Example operators include equals, notEquals equalsOneOf, lessThan, greaterThan, and exists operators. In one embodiment, operators act on XML elements, XML attributes, or on other conditions.

From the standpoint of the element operators, XML elements contain either child elements or character data. Therefore, the operands for an element comparison both represent the same type of content: either elements or character data. Character data can be in the form of a string, number, or date. Conditions involving elements that do not appear in the message will evaluate to false.

Attributes always have a type of character data, which can be string, number, or date. Many attributes are implicitly included in an XML document with default values. Therefore, an attribute identified in a condition can refer to either an explicit or implicit attribute. Conditions involving optional attributes that do not appear in the message will evaluate to false.

The usual boolean operators can combine conditions into more complex conditions. Condition operators act on other conditions. Example condition operators include AND, OR, XOR, and NOT condition operators.

The result of satisfying a rule's conditions is that an action will be triggered to modify the route for a message. Probably the most common result of a rule is to add one or more services into the route for a message. Several rule actions can be defined, including but not limited to an AddServiceAfter action, an AddServiceBefore action, an AddService action, a Redirect action, a ChangeTopic action, and a StopRuleEvaluation action.

In an AddServiceAfter action, a service (other than a final recipient service) can add a service after itself in the route. If this action appears more than once in the action list for a rule, the service is added such that the resultant service order is the same as the order of actions.

In an AddServiceBefore action, a service (other than a sending service) can add a service prior to itself in the route. If this action appears more than once in the action list for a rule, the services are added such that the resultant service order is the same as the order of actions.

The AddService action is identical to either the AddServiceAfter action or the AddServiceBefore action depending on the role the service has with respect to the message. For message senders, the services are added after the sender; for message recipients, the services are added prior to the recipient; for in-transit services, the services are added prior to the including service. This action generally enables rules that are useable by a service independent of role.

In a Redirect action, a service may wish to have the message redirected to another service in its place as the receiving service for the message. For example, a service may be a virtual service, and needs to redirect messages for that service to another service.

In a ChangeTopic action, if a first service includes a second service into the route or performs a redirect for a third service, then the first service can also change the topic of messages sent to the second service or the third service. The topic change will only apply to messages as delivered to the second service or the third service, and will revert to the original topic for subsequent services in the message route.

The StopScriptEvaluation action terminates the evaluation of subsequent scripts for the same service. Script evaluation will then continue for the next service in the route.

A service should maintain an evaluation sequence for the scripts associated with each role that the service can have with respect to a message. That sequence determines the order in which the scripts for that service are applied.

In one embodiment, scripts are evaluated in the following order: (1) scripts for the sender of the message; (2) scripts for services included by the scripts for the sender (this is recursive); (3) scripts for the recipients of the message, in the order of recipients in the message header; and (4) scripts for services included by scripts for the recipients (this is recursive).

When multiple scripts for a service include services into a route, the order of services in the route will follow the order of the scripts. That is, if script 1 inserts service A, and script 2 inserts service B, and if script 1 is evaluated before script 2, then service B follows service A in the route.

In one embodiment, routing scripts are evaluated only once during the initial calculation of the route for a message. The message header contains the basic information to initially construct a route, such as sending service 310 and recipient services 360. The message can also contain an explicit specification of a set of services to include in the route. Once the route is constructed from the header information, routing scripts are applied to further elaborate the route.

In an alternative embodiment, at least part of the message route is calculated after the physical routing of the message has begun. Dynamic routing is described in greater detail below in the context of physical and logical routing.

At the transport level, message interchange network 150 routes a message to a service by delivering the message through the Internet to a physical machine on which the service resides. That service operates on the message and, if the message is a request, returns a response message back through the Internet to message interchange network 150. The sequence of message deliveries and responses between message interchange network 150 and services represents the physical routing of a message.

Message interchange network 150 also provides a mechanism for a service to act on a message without the message being physically delivered to the service over the Internet. This mechanism is enabled through the logical routing of the message to the service. With logical routing, a service can modify the routing of the message or modify the context of the message for delivery to the next service. Significantly, a service can be logically included in a message routing, without being included as part of the physical routing of the message.

In one embodiment, logical routing of messages is implemented through the specification of routing scripts. As described above, a service can define one or more routing scripts. These defined routing scripts are stored within message interchange network 150 and are processed to determine what routing behavior should occur when a message is logically routed to the service.

Logical routing can take place statically or dynamically. With static logical routing, a message is logically routed to all services prior to any physical routing. In other words, message interchange network 150 logically routes the message to all services prior to the physical delivery of a message to any services. This logical routing is represented by the sequential evaluation of the routing scripts that are defined by those services. As noted above, in one embodiment, the routing scripts are evaluated in the following order: (1) scripts for the sender, (2) scripts for the services included by the sender (recursive), (3) scripts for the recipient, and (4) scripts for the services included by the recipient (recursive).

In dynamic logical routing, the logical routing is not completed prior to the start of the physical routing. Rather, the logical routing takes place in sequence with the physical routing of the message. The relation between logical routing and physical routing is described in greater detail below.

As noted, message interchange network 150 delivers a message logically to every service participating in a message's routing. Of those services, some subset will also accept physical delivery of the message.

To illustrate this concept, consider an example where service A includes service B into the message route. Service A can include service B into the route either prior to itself in the route (provided service A is not the originator of the message) or after itself in the route. In either case, message interchange network 150 would logically route the message first to service A, which includes service B into the route. Message interchange network 150 then logically routes the message to service B, and after service B produces a response, message interchange network 150 logically returns the response to service A. The point at which service A physically receives the message depends on whether service A included service B prior or after itself in the route. If service A includes service B prior to itself in the route, then the order of physical delivery is first to service B then to service A. Conversely, if service A includes service B after itself into the route, then the order of physical delivery is first to service A then to service B. In the latter case, the response from B is not necessarily physically delivered back to service A. Rather, it may be only logically delivered back to service A.

Services to which a message is logically routed do not necessarily have to also physically receive the message. In the above example, service A could have been logically routed, with physical delivery only to service B. Consider the following scenario. Suppose service X includes service A into the route and service A includes service B into the route. The logical routing of the message would proceed from service X to service A to service B back to service A back to service X. Service A can choose not to be included into the route for physical delivery, in which case the physical routing of the message is from service X to service.

In general, the act of routing a message (physically or logically) to a service can be thought of as an invocation of the service. When a service includes another service into the route of a message, the including service is effectively invoking the included service. The invocation of a service does not necessarily imply the physical delivery of information to the invoked service. The logical routing of a message is then the logical invocation of services. A route that includes a progression of services including other services can effectively be modeled as a progression of invocations.

In logical routing, each service is not only able to manage the inclusion of other services into the route but is also able to manage the context of those inclusions. From the standpoint of invocations, an invoking service is able to set the context for the invocation. An invoked service can also set the context of its return.

It is a feature of the present invention that message interchange network 150 effects context management on behalf of invoking services. As noted, while an invoking service can be logically included in a message routing, it need not be included as part of the physical routing of the message. In general, message interchange network 150 persistently stores contexts of a message, thereby enabling proper restoration of contexts upon return from an invocation.

In various embodiments, invocation context can include such information as the identity of the invoker service, arguments to the invoked service, a session identifier for the message, a topic for the message, billing responsibility for the invocation, or any other information that can be used by the invoked service. When a service is invoked, it receives a context from its invoker. That invoked service can then modify, if desired, parts of the context when invoking yet another service. Upon return from an invocation, message interchange network 150 automatically restores the context of an invoker to the state prior to the invocation. In one embodiment, the context of an invocation is included in the header information of the message delivered to a service. In another embodiment, the context of an invocation is based on one or more parts of a message.

Responses from invocations also contain context, such as the completion or error status of the response. When a service receives a returned response from an invocation, the context of the invoker is augmented by the context of the response. That service can then optionally modify the response context when returning to its invoker. It should be noted that just as logical routing can occur either statically or dynamically, context propagation (for both invocation and response) can also occur either statically or dynamically.

The ability of services to manage the context of their invocations provides a way for services to assume a large degree of Control over the scope of their participation in handling a routed message. For example, a service can choose to isolate its invoked services from being aware that the invocation occurs as part of a broader message routing. A service can choose to assume responsibility for charges incurred by subsequent nested invocations. A service can also choose whether or not to expose a received error condition up the invocation chain.

Message interchange network 150 can also use the invocation contexts to track messages and determine responsibility for invocations. Based on invocation contexts, message interchange network 150 can reconstruct the history of a message necessary for auditing and billing, as well as for reporting.

Having described a framework for logical routing and invocation of services, the description of the physical routing process is continued with reference to FIG. 3. In this example, it is assumed that static logical routing has produced a route for the message.

After deriving the route for a message, message interchange network 150 validates the route. There are numerous conditions that can cause a route to be invalid. F or example, there may be routing permission violations or a service may be currently disallowed by message interchange network 150 due to, for example, the non-payment of usage bills.

If the route is determined to be invalid, then message interchange network 150 rejects the posted message and may return an error to the sending service 310 either in the response to the posting call or in an error message.

Message interchange network 150 routes the message to all services in the calculated route. In the event of failure at any stage in the routing, message interchange network 150 aborts the message routing and, if the original message was a request, returns an error message back to sending service 310. For messages with multiple recipients, an error in the routing to one recipient will not necessarily affect routing to other recipients. Errors during routing can occur due to several circumstances. For example, a message may fail to reach a recipient within the expiration time for the message, a service may fail to return a reply to a delivered message, or a service may return an error status for a message.

Message interchange network 150 sequentially delivers a message to each service identified in the message route. In FIG. 3, this process is illustrated as a flow of the posted message through message routing element 340, and on to one or more services 350. In one embodiment, message interchange network 150 includes all of the message documents in the message delivered to service 350, even if service 350 only expects to operate on one document or documents of a particular content.about.type. Service 350 would ignore documents that it does not expect.

As noted, message interchange network 150 invokes in.about.transit services in the same way as delivering a message to any sending or recipient service. In general, a service does not necessarily need to be aware whether it is being invoked as an in.about.transit service or as a recipient service.

After processing the message, service 350 sends the results in a response message back to message interchange network 150. If service 350 is unable to produce a valid result for its operation on a message, then service 350 may return an error code in its response message to message interchange network 150. If service 350 fails to respond to a received message, the message will ultimately expire, and message interchange network 150 may return an error message back to the sending service 310.

Upon receipt of the response message from service 350, message interchange network 150 then routes the message to the next destination (e.g., another service 350) on the routing list. After passing through each of the intermediate destinations on the routing list, the message is then stored in queue 334 for recipient service 360. It should be noted that queues can also be associated with in-transit services 350. For simplicity, these queues are not shown in the illustrated embodiment of FIG. 3.

Application 372 in recipient service 360 can retrieve the message from queue 334 via message poll interface 328. In the poll mode, application 372 periodically issues a call to message poll interface 328 to ask for any waiting messages. If there are queued messages waiting for delivery to that service, then the one or more messages are returned in a reply. When making poll requests, a service can provide selectors on the messages to fetch. For example, a service can retrieve messages based upon the sender, message type, topic, etc.

In an alternative embodiment, message delivery is enabled through a push mode. In the push mode, the recipient would have its own server to which message interchange network 150 can send messages. A service can specify a maximum number of tries, as well as the retry interval, for message interchange network 150 to send the message to the service before aborting pushed delivery. A service to which message interchange network 150 pushes messages can also optionally poll for messages.

In the push mode, a service can also specify a delivery window in which it will accept pushed messages. For example, a service might only accept messages between the hours of 1 AM and 2 AM.

As further illustrated in FIG. 3, a response message can be posted by recipient service 360 to message post interface 326. The message is then routed through one or more services 350 prior to being stored in message queue 332. The message can then be retrieved by sending service 310 through message poll interface 322. As noted, the return path would not necessarily match the forward path.

In one embodiment, the sender of a message can specify a time by which the routing of a message must complete. If that expiration time passes before delivery of the message to it final destination, message interchange network 150 will abort further routing of the message. In one embodiment, the final destination for a request message is the delivery of a response message back to the original request sender. In this embodiment, senders of response messages cannot specify an expiration since the response is considered part of the routing of the original request message. If a request message expires, message interchange network 150 will return an error response back to the sender. If the sender does not specify an expiration time, then a default message expiration time (e.g., 48 hours) can be used. It should be noted that message expiration is not the same as document expiration. Document expiration is associated with a specific document and indicates how long the document's information is valid.

As part of the message delivery process, message interchange network 150 logs all posted messages, including invalid messages. For each message, message interchange network 150 logs relevant information to track the history of the message. Message interchange network 150 also maintains a correlation between messages. That is, for request messages, message interchange network 150 associates the log of the response message(s) with the log of the request message.

In one embodiment, logged information can include the message header, the calculated route for the message (unless route calculation fails), the status of route validation, the size of the message at each stage of the route, and the routing history, including the status for each service along the message's route. The status values for each service depends on the role of the service.

Message interchange network 150 correlates all messages for the same message transaction. That is, for request messages, message interchange network 150 associates the log of the response message(s) with the log of the request message. Similarly, if a message causes an error message, then message interchange network 150 associates the log of the generated error message with the log of the original message.

Having described a general framework of operation of message interchange network 150, an example message sequence is provided to illustrate the concepts described above. In the example message sequence illustrated in FIG. 4, a message is routed from sender 402 to recipient 404. During this message routing, the message is also passed through in-transit services 406, 408, 410, and 412. The specific operation of services 406, 408, 410, and 412 will become apparent through the description of the message operation sequence.

In the illustrated example, sending service 402 represents a business named MyBiz.com. MyBiz.com desires to send a purchase order to The Acme Company, which operates as recipient service 404. Before being delivered to The Acme Company, the purchase order message is sequentially routed by message interchange network 150 through Transmatics (XSLT) service 406, XpandiCo service 408, Transmatics (replaceElement) service 410, and KeepEmOut.com service 412.

In general, services 406, 408, 410, 412 are operative to perform transformations, enrichment, and filtering functions on the purchase order message. In the present example, Transmatics (XSLT) service 406 is operative to transform address data in the message body, Xpandico service 408 is operative to augment a zip-code address, Transmatics (replaceElements) service 410 is operative to relate sets of values from disparate data sources, and KeepEmOut.com service 412 is operative to filter messages for The Acme Company.

As noted, services 406, 408, 410, 412 can be added to a routing list based upon routing scripts that are created for one or more of sending service 402, recipient service 404, or in-transit services 406, 408, 410, 412. In the present example, services 406, 408, and 410 are added to the route list in accordance with routing scripts defined for sending service 402, while service 412 is added to the route list in accordance with routing scripts defined for recipient service 404. An example embodiment of the message sequence between services in the routing list is now provided.

As noted, in one embodiment, a message includes a header element, a body element and/or attachments. In general, the header element includes the basic delivery information for the message, and the body element/attachments includes the document(s) the sender is sending to the recipient. As would be appreciated, further message elements can be defined. For example, in another embodiment, a message would include header, body, routing, and route trace elements. Here, the routing element includes a listing of a sequence of services that should operate on the message prior to delivery to the recipient, and the route trace element includes the routing history information.

Appendix B.1 illustrates an example of a message that is posted by MyBiz.com to message interchange network 150. As illustrated, the message includes a header element at lines 4-17 and a body element at lines 18-28.

The header element at lines 4-17 includes elements To, From, and Expiration. To element also includes two Service elements, one of which includes the element Arguments. As illustrated, one of the Service elements identifies the recipient service "TheAcmeCompany/Supply," the service that is representative of recipient 404 in FIG. 4. The element Arguments provides parameters that further specify what the "TheAcmeCompany/Supply" service is to perform (I.e., ProcessPurchaseOrder).

As illustrated, at line 14, the From element includes a service identifier for MyBiz.com (i.e., "386b4520f489c217"). Finally, at line 16, the Expiration element specifies a time by which the message should complete its routing.

The body element of the message is located at lines 18-28. In this message element, the purchase order data is included at lines 21-25. As will be described below, the purchase order data can be transformed and enriched by services in the routing list.

As noted, the sender can specify an explicit sequence of services that should operate on the message. The sender can also implicitly include services in the routing list for a message through the specification of routing scripts associated with the defining service. In the example message of Appendix B.1, no services are explicitly identified in the message. Rather, the services are included based on routing scripts that are defined by the various services. In the present example, the routing list includes, in order, Transmatics (XSLT) service 406, XpandiCo service 408, Transmatics (replaceElement) service 410, and KeepEmOut.com service 412.

The first service on the routing list is the Transmatics (XSL T) service 406. In the present example, service 406 is included in the routing list based upon a routing script defined for sender 402. Transmatics (XSL T) service 406 is a transformation service that uses the Extensible Stylesheet Language Transformations (XSLT) language.

Generally, XSLT is a language for transforming XML documents into other XML documents. XSLT is designed for use as part of the XSL, which is a stylesheet language for XML. In addition to XSLT, XSL includes an XML vocabulary for specifying formatting. XSL specifies the styling of an XML document by using XSLT to describe how the document is transformed into another XML document that uses the formatting vocabulary.

In the present example, Transmatics (XSL T) service 406 is operative to transform data in the purchase order message. This transformation is illustrated in Appendix B.2, which shows the purchase order message as it is delivered to XpandiCo service 408 after being processed by Transmatics (XSLT) service 406. More specifically, the transformation operation is illustrated upon comparison of the Address element at line 25 of the message in Appendix B.1. to the Address element at lines 24-28 of the message in Appendix B.2. In this transformation process, an Address element including the entire address has been transformed into an Address element that includes further child elements (i.e., Street, City, and Zip) directed to components of the Address.

As can be appreciated, this transformation process can be used to ensure that the purchase order to be delivered to a particular recipient service 404 is placed in the proper format. If other recipients require a purchase order to appear in different formats, then further transformation operations can be defined and implemented by a service attached to message interchange network 150.

After the message is processed by Transmatics (XSL T) service 406, it is then sent to the next service on the routing list. In this example, the next service on the routing list is HJ XpandiCo service 408.

As illustrated in Appendix B.2, the message delivered to XpandiCo service 408 includes Header and Body elements that are similar to the corresponding elements in the message that was posted by MyBiz.com.

The Header element in the message delivered to XpandiCo service 408 also includes a Session element and a Token element. The Session element at line 4 includes a unique session identifier (i.e., "34b9f6dO-8geb-b5e1-0022-a376bf4Ic165") that is assigned by message interchange network 150 to the message. This unique session identifier enables tracking of the message through the routing network. The Token element at line 5, on the other hand, is a unique reference identifier (i.e., "84e309b38c56a18cb9835203") that enables message interchange network 150 to uniquely identify a delivered message in the routing network. This unique identifier serves as a message reference in response messages.

As further illustrated in Appendix B.2, the To element, at lines 6-12, includes the service identifier (i.e., "3340f32c035d7499") for XpandiCo as well as the enrichment operation that is desired to be invoked. Specifically, at line 7, the purchase order message identifies the "zipPlus4" operation. The "zipPlus4" operation is an example of an enrichment operation, wherein a 5-digit zip code is expanded to a 9-digit zip code.

After the "zipPlus4" enrichment operation is completed, XpandiCo service 408 returns a response message to message interchange network 150. The returned response message is illustrated in Appendix B.3. As appears at line 19 of the message, the Zip child element of the Address element has been modified to include a 9-digit zip code.

After XpandiCo service 408 returns a response message to message interchange network 150, the message is then forwarded by message interchange network 150 to the Transmatics (replaceElement) service 410. In general, Transmatics (replaceElement) service 410 provides a cross-reference ID mapping function. This function provides the ability to relate sets of values from disparate data sources to each other. These related values are stored persistently fob by the cross-reference service 410 and can be substituted for each other whenever a message travels from one of the sources to another.

This cross-reference function is especially useful for relating key or ID values of two independent data sources. For example, consider a scenario where two different services independently maintain a customer contact list for the same customer. In this case, it would be difficult for each service to process a change message from the other without a cross-reference map because the receiving service would have no explicit way of knowing which record to update. By using cross-reference service 410, however, the receiving service's record ID could be automatically substituted for the sender's record ID, thereby enabling the receiving service to easily process the message and update the correct record.

In one embodiment, a cross-reference map actually stores a set of records for each service sharing a cross-reference map. Each record can include an arbitrary number of name/value pairs, although one of them is identified as the key. Records from different services can then be related to each other in one of two ways. In one method, different services can be related to each other explicitly by relating two key name/value pairs from different services. In another method, services can be related to each other automatically by having the cross-reference service 410 process the response to a message as well as the originating message.

As would be appreciated, the cross-reference map can be queried later by specifying a specific service, key name, and key value. The extracted name/value pairs from all related records can then be used to transform a message.

Figure 4:
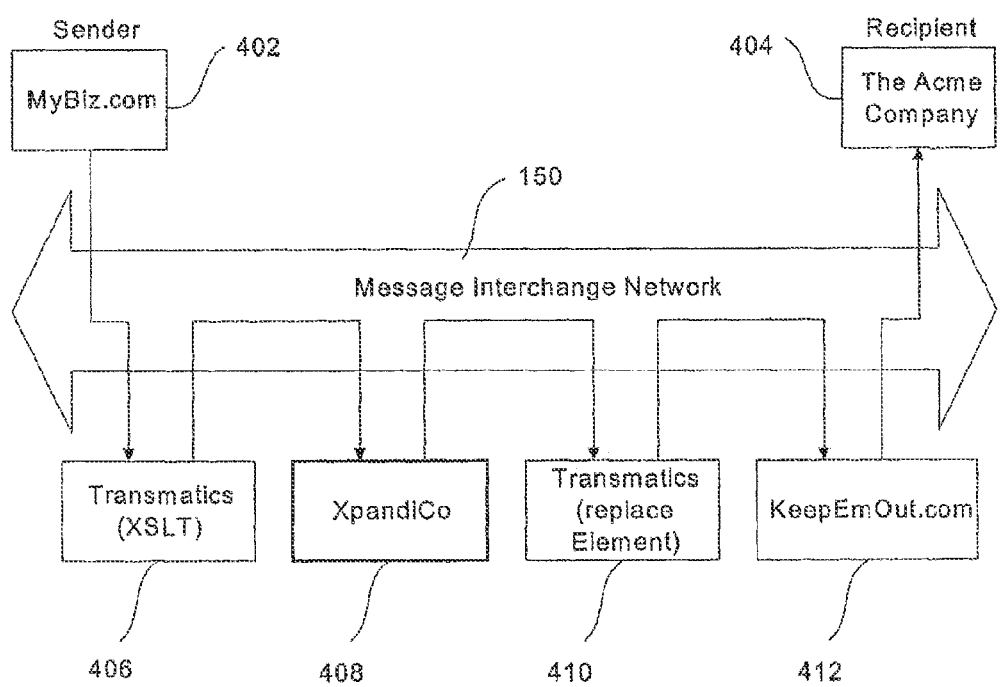
FIG. 4 illustrates a message flow sequence.

In the example of FIG. 4, Transmatics service 410 is being called upon to perform a replaceElement operation on the CustomerNumber. After the CustomerNumber is replaced with a number that is recognized by The Acme Company, Transmatics service 410 returns a response message to message interchange network 150. As illustrated in Appendix B.5, the customerID element at line 23 has been changed to "BX0045012" from the previous customerID value of "3489."

After the replaceElement operation has been performed by Transmatics service 410, the message is then forwarded to KeepEmOut.com service 412. KeepEmOut.com service 412 performs a message filtering service by ensuring that The Acme Company will only receive messages from authorized entities. As such, KeepEmOut.com service 412 can be included into the routing list based on a routing script that has been defined by The Acme Company.

If the message passes through KeepEmOut.com service 412, then the message is finally delivered to The Acme Company service 404. An example message as delivered to The Acme Company is illustrated in Appendix BA. An example of a response message by The Acme Company to MyBiz.com is also illustrated in Appendix B.5.

As thus described, message interchange network 150 enables flexible interaction with third-party services. The connection of these third-party services to an open platform enables enterprise customers to flexibly define their message transaction framework. As will be described in greater detail below, message interchange network 150 can also be used to enable flexible interaction between enterprise customers and their ASPs.

In general, the distribution of an enterprise's information among ASPs requires a security framework by which each ASP can authenticate access to that enterprise's information, by another ASP. In a point-to-point-messaging model, the conventional approach is to embed the authentication information (encrypted) in the message itself or in some challenge protocol. In a collaborative environment, this authentication approach suffers several disadvantages. First, the originator of a message may be an ASP acting on behalf of an enterprise, and will therefore be unaware of the authentication credentials to present to the recipient ASP. Second, the authentication credentials are applicable only to the recipient ASP and do not authenticate access of other services in the message's route. Third, many systems use standard HTTPS-based authentication, which requires synchronous invocation of the recipient. Polling for messages would therefore be disallowed. Finally, services along a message's route that operate on the message's content should not have visibility to the authentication information.

In accordance with the present invention, message interchange network 150 authenticates each service that participates in a message's route. Message interchange network 150 can then provide an authentication token that substitutes for an enterprise's authentication credentials. The proposed token is an identifier (GCID) that represents an authenticated service to the enterprise's account with a specific ASP. An ASP that receives a GCID in a message only needs to authenticate message interchange network 150 since message interchange network 150 has already authenticated the message sender. The ASP can either have an internal map between the GCID and enterprise account identifier, or can require the account identifier to accompany the GCID.

If the ASP does not want to maintain its own internal mapping between an enterprise's GCID and the enterprise's account, then the ASP would provision the enterprise's account identifier to message interchange network 150. Message interchange network 150 would then insert the account identifier with the GCID in any subsequent messages from the enterprise to ASP 620.

For both an enterprise and ASP to trust a GCID provided by message interchange network 150, the GCID should be validated by both organizations as representing the enterprise's account on the ASP. Setting up this trust relationship is accomplished through a provisioning process that is completed prior to the routing of messages between the enterprise and the ASP. The process of provisioning a trusted GCID in message interchange network 150 involves two authentication steps: the enterprise first authenticates itself to message interchange network 150 and receives a GCID, then the enterprise authenticates itself to the ASP and associates the GCID with the enterprise's account.

Figure 6:
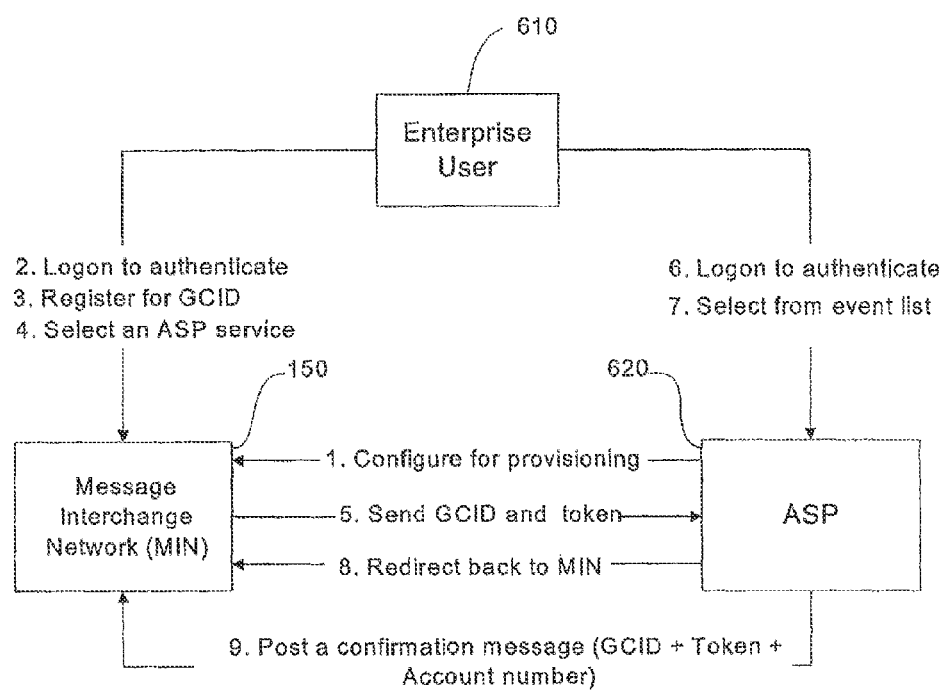
FIG. 6 illustrates a provisioning process.

FIG. 6 illustrates an embodiment of the provisioning process. It should be noted that in the illustrated embodiment of FIG. 6, it is assumed that the enterprise and the ASP have already registered with message interchange network 150.

The provisioning process begins at step (1) where ASP 620 registers with message interchange network 150, alerting message interchange network 150 that its service requires provisioning. In this process, ASP 620 provides a URL to message interchange network 150. The provided URL enables an enterprise user 610 to logon to the ASP's website for provisioning.

At step (2), enterprise user 610 logs in to the message interchange network's web site. This authenticates enterprise user 610 with message interchange network 150. Enterprise user 610 then registers for a GCID at step (3). This GCID will represent an authenticated entity that can both send and receive messages through message interchange network 150. At step (4), enterprise user 610 selects a service from the message interchange network directory representing an ASP with whom the enterprise has an account.

At step (5), message interchange network 150 then automatically redirects enterprise user 610 to a website at ASP 620. In this process, message interchange network 150 sends the enterprise's GCID and a provisioning token to the web page.

In one embodiment, message interchange network 150 passes a GCID, a provisioning token, and a return URL as a query string in the ASP's URL using three parameters: serviceID—an 8 byte hex number representing the GCID registered by an enterprise user; token—an 8 byte hex number representing a unique token to be returned in the confirmation message from the ASP back to message interchange network 150; and returnURL—a URL string representing where the user should be redirected to after completing the authentication and provisioning process at the ASP website.

An example of a redirect URL would be:
https://www.asp.com/
gc?serviceID=345023ba2300d353&token=459012c9a78b90af&returnURL=https://www.grandcentral.com/provisioning/auth.jhtm On the ASP's website, enterprise user 610 logs in to ASP 620 at step (6), thereby being authenticated by ASP 620. ASP 620 will then recognize the validity of the GCID as representing enterprise 610. At step (7), the ASP's website can optionally allow enterprise user 610 to select events (if any) for which the ASP's service should send notification messages to the enterprise's GCID.

After authenticating enterprise user 610 and allowing enterprise user 610 to select events, the ASP website redirects enterprise user 610 back to the message interchange network website at step (8). Next, at step (9), ASP 620 posts a message to message interchange network 150 indicating that ASP 620 has accepted the enterprise user's authentication of the GCID. In one embodiment, the message contains both the GCID and the provisioning token originally sent to the ASP's webpage by message interchange network 150. In general, this back-channel confirmation, as opposed to returning a confirmation in a URL redirect back to message interchange network 150, prevents spoofing of the confirmation.

In one embodiment, ASP 620 posts the confirmation message to message interchange network 150 using the message interchange network messaging protocol. Message interchange network 150 would expect specific values in some of the message elements. An example of a confirmation message (showing only the relevant message elements) is shown below. As would be appreciated, the actual values of the arguments and document content would be dependent on the specific provisioning circumstances.

```
<Message >type="request If>
    <Header>
    ....
    <To>
        <Service)name="grandcentral/provisioning">
            <Arguments>
                <! [CDATA[
                <token>459012c9a78b90af</token>
                <gcid>63801c78327fd901</gcid>
                <operation)name="setPermission">
                    <parameter>include</parameter>
                </operation> <operation)name="setCookie"/>
                ]]>
            </Arguments>
        </Service>
    </To>
    </Header>
    <Body>
        <Document >-Ld="COOKIE" > content-type="text/xml"
        )encoding="none ">
            <! [CDATA[
            <! -- > insert >enterprise >account > information>-->
            11>
        </Document>
    </Body>
</Message>
```

In one embodiment, ASP 620 posts the confirmation message to message interchange network 150 using the message interchange network messaging protocol. Message interchange network 150 would expect specific values in some of the message elements. An example of a confirmation message (showing only the relevant message elements) is shown below. As would be appreciated, the actual values of the arguments and document content would be dependent on the specific provisioning circumstances.

The values for the GCID and token parameters in the arguments should be the values received via the web interface redirection. The cookie parameter (and the document in the message body) can be omitted from the confirmation message if ASP 620 maintains the map between the GCID and enterprise account identifier. Otherwise, the contents of the document element should be whatever text or XML ASP 620 requires to determine the enterprise's account identifier.

In general, a service can register a block of text or XML (referred to as a cookie) that message interchange network 150 is to include with a message whenever a message is delivered; D to the service. This cookie is analogous to cookies in web browsers. An example of a cookie is account information that a service requires when receiving a message from particular sources. This eliminates the need for the sender of a message to include, or even be aware of, this information when sending the message.

If enterprise user 610 fails authentication by ASP 620, ASP 620 should not send a confirmation message to message interchange network 150. ASP 620 should, however, provide immediate feedback to enterprise user 610 on the web page that authentication failed.

After processing the confirmation message, message interchange network 150 returns a status response to ASP 620. The status element in the response message will be absent in the case of a success and otherwise will contain an error code.

In one embodiment, message interchange network 150 must receive the confirmation message from ASP 620 within 24 hours after enterprise user 610 initiates provisioning a GCID. If message interchange network 150 does not receive the confirmation within that time period, then the provisioning token will expire. If message interchange network 150 receives a confirmation message after the token has expired, message interchange network 150 would not recognize the confirmation and would return an error back to ASP 620. If no confirmation is received, message interchange network 150 would not notify either ASP 620 or enterprise user 610 about the expiration of the provisioning token.

In an alternative embodiment of the provisioning process, ASP 620 provides a launch point from its own website for provisioning. ASP 620 could then redirect a user originally at the ASP site over to the message interchange network site to register for a GCID. In this embodiment, step (8) would not be necessary after message interchange network 150 redirects the user back to the ASP's site.

It is a feature of the present invention that the provisioning process can set up a trust relationship between the enterprise and the ASP. When ASP 620 returns the provisioning confirmation message to message interchange network 150, ASP 620 is indicating that its service trusts the enterprise's GCID for sending messages and trusts all of the enterprise's GCIDs for receiving messages. Similarly, by this provisioning process, the enterprise is indicating trust of ASP 620 for sending and receiving messages.

It should be noted that if an ASP does not wish to expose the notion of accounts (i.e., messages to the ASP are not account-specific), or if the ASP does not wish to exploit the message interchange network's authentication framework, then the ASP may choose not to require authentication of an enterprise's GCID to a specific account in the ASP, and this provisioning process is not required.

If ASP 620 wants to revoke the authenticated association between an enterprise's GCID and the enterprise's account in ASP 620, ASP 620 can simply cease to recognize the association between the GCID and account. In this case ASP 620 would return an error response whenever it receives a message from that GCID. ASP 620 can also use the message interchange network website to unset permissions granted by ASP 620 to the enterprise. Message interchange network 150 would then not allow the enterprise's GCID to send messages to ASP 620.

Alternatively, ASP 620 can send a request message to message interchange network 150 to revoke the previously provisioned permissions and cookie. In one embodiment, this message would contain the following information:

```
<Message >type="request">
    <Header>
        ....
        <To>
            <Service)name="grandcentral/provisioning">
                <Arguments>
```

```
                    <! [CDATA[
                        <gcid>63801c78327fd901</gcid>
                        <operation)name="clearPermission">
                            <parameter>include</parameter>
                        </operation>
                        <operation)name="setCookie"/>
                    ]]>
                </Arguments>
            </Service>
        </To>
    </Header>
    <Body>
</Message>
```

The effect of this revocation message is that message interchange network 150 automatically revokes all permissions granted by ASP 620 to the enterprise, and message interchange network 150 removes the mapping of the enterprise's GCID to ASP's cookie in the message interchange network registry.

After processing the revocation message, message interchange network 150 returns a status response to ASP 620. The status element in the response message is absent in the case of a success and otherwise will contain an error code.

After an enterprise provisions a trusted GCID between an enterprise and an ASP's service, the GCID becomes a mapped service representing the ASP's service specific to the enterprise's account. The following scenarios illustrate how this GCID would be used in various messaging situations.

First, assume that the enterprise wishes to send a message to the ASP specific to the enterprise's account with the ASP. The enterprise should then send a message to its mapped service for the ASP:

```
<Message >type="request">
    <Header>
        <From>
            <Service)gcid ="enterprise"/>
        </From>
        <To>
            <service )gcid=" enterprise/mappedService" />
        </To>
    </Header>
</Message>
```

This would be translated by message interchange network 150 for delivery to the ASP:

```
<Message >
    <Header>
        <From>
            <service )gcid=" enterprise/mappedService" />
        </From>
        <To>
            <Service)gcid="asp/service">
                <Cookie><! [CDATA[account~1234511]></Cookie>
            </Service>
        </To>
    </Header>
</Message>
```

It should be noted that the enterprise could send the message directly to the ASP rather than to the mapped service, and the cookie would still be inserted correctly by message interchange network 150. The advantage for the enterprise in sending the message to the mapped service rather than directly to the ASP is to facilitate a consistent tracking of invocations of the ASP whether from the enterprise or from another ASP on behalf of the enterprise.

In a second scenario, assume that an enterprise has accounts with more than one ASP. When integrating the exchange of information between these ASPs, the enterprise may allow one ASP to send requests or notifications to another ASP on behalf of the enterprise. With mapped services, the ASPs do not actually need to know each other specifically. A first ASP would send a message to the enterprise's service mapped to the second ASP:

```
<Message >
  <Header>
    <From>
      <Service >gcid="aspl/service" />
    </From>
    <To>
      <service)gcid="enterprise/mappedService"/>
    </To>
  </Header>
</Message>
```

Note that the message as delivered to the second ASP hides the identity of the first ASP. In effect, message interchange network 150 effects a virtual proxy service in mapping between services. Accordingly, if the message is a request, then the second ASP's response message would be returned to the enterprise's mapped service and redirected to the first ASP.

Figure 5:
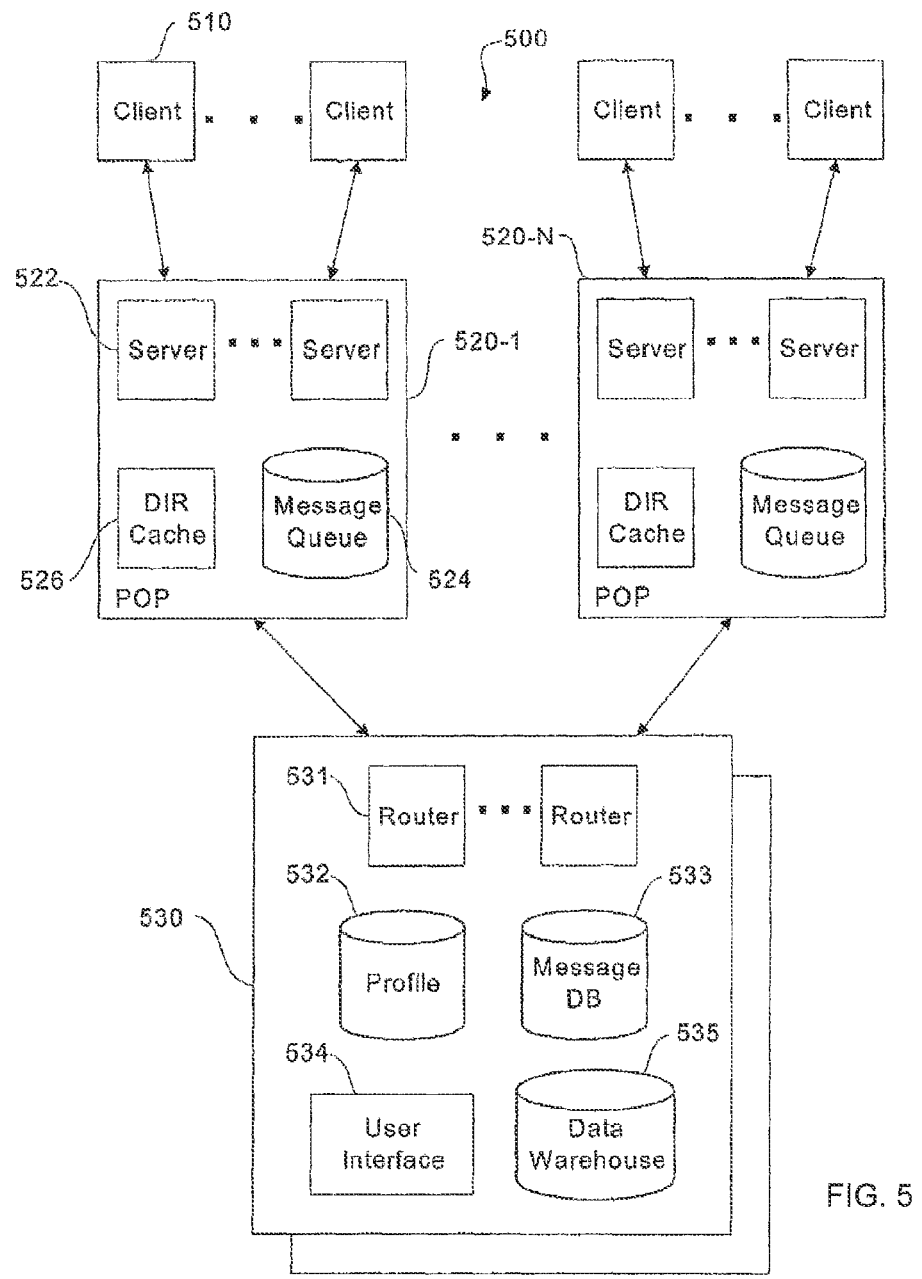
FIG. 5 illustrates an embodiment of a message exchange network.

Having described the flexibility in the operation of message interchange network 150, an embodiment of message interchange network 150 is now provided with reference to FIG. 5. FIG. 5 illustrates a message routing network 500 that includes clients 510, points of presence (POP) 520-*n*, and data center 530.

Clients 510 are generally assigned to a particular POP 520-*n*. POPs 520-*n* include a plurality of servers 522, a message queue 524, and a directory cache 526. Directory cache 526 includes profile information on clients 510. The content of directory cache 526 is based on profile database 532.cndot. in data center 530. Message queue 524 is operative to store messages that are posted by clients 510 and to store messages that are awaiting delivery to clients 510. Finally, servers 522 are lightweight servers that process HTTP transactions. Servers 522 are operative to receive messages posted by clients 510, and to send messages to clients 510. As noted, clients 510 can have messages pushed to them or can retrieve messages as part of a polling process.

Routing within message routing network 500 is generally enabled through routers 531*m* in data center 530. In one embodiment, routers 531 are operative to pull messages from message queues 524 in POPs 520-*n*, perform route calculations, and post messages to message queues 524 that are located in a POP 520-*n* that is assigned to the destination client 510.

Headers of messages that are routed by routers 510 are stored in message database 533. Message database 533 retains updated states of message objects that are routed through message routing network 500.

Also included within data center 530 is profile database 532, data warehouse 535, and web interface component 534. Profile database 532 stores profile information for registered clients 510. The profile information includes routing rules that have been defined for the various clients 510. Data warehouse 535 stores a collection of log information relating to messages that are processed by message routing network 500. Finally, user interface component 534 enables clients 510 to enter profile information into profile database 532, access reports in data warehouse 535, and perform directory lookups to find other connected services.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

APPENDIX A—EXAMPLE MESSAGES AND MESSAGE ELEMENTS

I. Messages
Posted Request and Notification Messages

```
<Message>
  <Header>
    <To/>
    <From/>
    <Topic/>?
    <Expiration/>?
  </Header>
  <Body>
    <Document/>*
  </Body>
</Message>
```

Posted Response Messages

```
<Message>
  <Header>
    <Token/>
    <From/>
    <Status/>?
  </Header>
  <Body>
    <Document/>*
  </Body>
</Message>
```

Delivered Request and Notification Messages

```
<Message>
  <Header>
    <Session/>
    <Token/>
    <To/>
    <From/>
    <Topic/>?
  </Header>
  <Body>
    <Document/>*
  </Body>
</Message>
```

Delivered Response Messages

```
<Message>
  <Header>
    <Session/>
    <Token/>
    <To/>
    <From/>
    <Topic/>?
    <Status/>?
  </Header>
```

```
<Body>
    <Document/>*
</Body>
</Message>
```

II. Message Elements

<Message>

Purpose: Root envelope for a message.

Message Types: All message types.

Attributes: type (required)=request|response|notification
test (optional)=false (default)|true Child Elements: Header—{1}, Body—{1}

Note: The test attribute indicates if the message is a test message—that the message should be routed with no persistent effects in any of the participating services. The message type is "request" when a message is delivered to an engine.

<Header>

Purpose: Root element for a message header.

Message Types: All message types.

Attributes: None.

Child Elements: Session, Token, To, From, Topic, Status, Expiration {Cardinality of elements depends on message type}

<Session>

Purpose: Unique session identifier assigned by message interchange network to the message.

Message Types: All delivered message types.

Attributes: id (required) (globally unique identification string)

Content: None.

Note: The session is effectively a "tracking slip" for messages. In one embodiment, all services in a message's route receive the same session identifier. The scope of a message session depends on the message type. For a request message, the message session includes the response as well—therefore response messages do not receive a new session. For a notification, the message session only applies through to the recipients. In an alternative embodiment, a service can demand a new session for an included service, thereby hiding some services from being tracked by the original sender.

<Token>

Purpose: Unique reference identifier assigned by the message interchange network.

Message Types: All delivered message types. Posted response.

Attributes: value (required)=(unique identification string)

Content: None.

Note: A token is used to uniquely identify a delivered message when issuing an acknowledge to polled delivery, and serves as a message reference in posted response messages. When a service posts a response message, the message includes the token from the previously received request message.

<To>

Purpose: identification of the recipients of the message.

Message Types: All message types except posted response.

Attributes: None.

Child Elements: Service—{1:N}

Note: The To element indicates the recipients of a posted request or notification message. In delivered messages, the To element indicates the service invoked and contains the arguments and cookie necessary for the service to process the message. Posted request and notification messages may have multiple recipients, in which case there will be multiple child Service elements. All delivered messages can include only one Service element.

<Service>

Purpose: Identifies a service connected to the message interchange network

Message Types: All message types.

Attributes: gcid=(unique service identifier assigned by the message interchange network to the service);
name=(name of organization owning the service)/(service name)

Child Elements: Arguments—{0:1}, Cookie—{0:1}

Note: At least one of the two attributes Should appear in order to specify the service. If one of the attributes is omitted, the message interchange network fills in the omitted attribute when composing a header for delivery.

<Arguments>

Purpose: Text or parameters that further specifies what the service is to perform and how.

Message Types: All message types.

Attributes: None.

Content: Text string (as xml CDATA block).

Note: The format of the argument string is up to each service to define. The Arguments element need not be parsed or verified by the message interchange network. It is the responsibility of the message composer to insert the necessary contents understandable by the service. Whether or not the text is XML, the contents of the Arguments element, should be enclosed in a CDATA block.

<Cookie>

Purpose: Service-defined block of text or parameters that a service wants delivered with invocation.

Message Types: All message types.

Attributes: None.

Content: Text string (as xml CDATA block).

Note: The cookie element contains a block of text (or xml) previously registered by a service with the message interchange network. The format of the cookie string is up to each service to define. The Cookie element need not be parsed or verified by the message interchange network. Whether or not the text is XML, the contents of the Cookie element will be enclosed in a CDATA block.

<From>

Purpose: Identification of the sending (or invoking) service of the message.

Message Types: All message types.

Attributes; None.

Child Elements: Service—{1}

Note: The From element indicates the sender of the message to the receiving services. In the delivery header, the service in the From element is the "logical" sender representing the service that included the receiving service into the message route. Thus, each receiving service perceives the received message as an invocation from the including service rather than a message coming from the originating sender service.

<Topic>

Purpose: Indicate the topic of the message.

Message Types: All message types except posted response.

Attributes: None.

Content: Dot-separated topic category.

Note: Topic provides a categorization of the message. The categorization should be hierarchical, but the message interchange network need not have a predefined set of topics. The Topic element is useful for services that push out events, where the topic can be the name of the event for which recipients are being notified.

\<Status\>
Purpose: Indicates the status of processing a request.
Message Types: Response.
Attributes: None.
Content: Dot-separated status code.
Note: The status element provides a means for the respondent of a request message to indicate the success (or lack thereof) of processing the request message. Absence of the status element in a response message indicates unqualified success of the response. In the case of a qualified success (e.g., a warning, a fault, a failure, or other status), a service should include the status element and provide an appropriate status code indicating the problem.
\<Expiration\>
Purpose: Specifies a time by which a message must complete its routing.
Message Types: Posted request and notification.
Attributes: units (optional)=Msec (default)|sec|hr
Content: numeric value.
Note: The expiration specifies when the message must reach its final destination. For request messages, the expiration includes the return of the response message. For notification messages, the expiration only applies up to delivery to the recipients. Expiration time is measured against the time the message is first posted to the message interchange network.
\<Body\>
Purpose: The root element for the actual message data.
Message Types: All message types.
Attributes: None.
Child Elements: Document—{0:N}
\<Document\>
Purpose: A self-contained unit of message data.
Message Types: All message types.
Attributes: id (optional)=(fragment name for document element);
content-type (required)=(MIME type);
schema (optional)=(URI to schema used for document; no default);
xmlns (optional)=(URI to namespace used in document; no default);
encoding (optional)=none (default)|base64
Content: The document data—XML, binary, free text, or any other format.

APPENDIX B.1—MESSAGE AS POSTED BY MYBIZ.COM

```
1  <Message >xmlns="http://namespaces.grandcentral.com/messages/env-v01"
2     >type="request" >test="false">
3        <Header>
4           <To>
5              <Service >name="TheAcmeCompany/Supply">
6                 <Arguments>
7                    <! [CDATA[action=ProcessPurchaseOrder]]>
8                 </Arguments>
9              </Service>
10             <Service >name="BigBrother/GlobalListener"/>
11          </To>
12          <From>
13             <Service>gcid="386b4520f489c217"/>
14          </From>
15          <Expiration>units="hr">20</Expiration>
16       </Header>
17       <Body>
18          <Document >id="doc-1">content-type="text/xml">encoding="none">
19             <PurchaseOrder >xmlns="urn:MyBiz:ns-1">
20                <Id>89987</Id>
21                <Item>type="SKU">3456-76987-34</Item>
22                <Quantity>2</Quantity>
23                <CustomerNumber>3489</CustomerNumber>
24                <Address>31>Ocean>Front>WaySomeCity,>AK, >10984</Address>
25             </PurchaseOrder>
26          </Document>
27       </Body>
28 </Message>
```

APPENDIX B.2—MESSAGE AS DELIVERED TO XPANDICO

```
1  <Message>xmlns="http://namespaces.grandcentral.com/messages/env-v01"
2     >type="request">
3        <Header>
4           <Session>id="34b9f6d0-89eb-b5e1-0022-a376bf41c165"/>
5           <Token>value="84e309b38c56a18cb9835203"/>
6           <To>
7              <Service>gcid="3340f32c035d7499">name="xpandico/zipPlus4">
8                 <Arguments>
9                    <![CDATA[element=PurchaseOrder/Address/Zip]]>
10                </Arguments>
11             </Service>
12          </To>
13          <From>
14             <Service>gcid="386b4520f489c217">name="mybiz.com"/>
```

```
15          </From>
16       </Header>
17       <Body>
18          <Document>id="docA">content-type="text/xml">encoding="none">
19             <PurchaseOrder>xmlns="http://www.estandards.org/PurchaseOrderRequest">
20                <POId>89987</POId>
21                <Item>type="SKU">3456-76987-34</Item>
22                <Quantity>2</Quantity>
23                <CustomerID>3489</CustomerID>
24                <Address>
25                   <Street>31>Ocean>Front>Way</Street>
26                   <City>SomeCity,>AK</City>
27                   <Zip>10984</Zip>
28                </Address>
29             </PurchaseOrder>
30          </Document>
31       </Body>
32 </Message>
```

APPENDIX B.3—RESPONSE MESSAGE AS RETURNED FROM XPANDICO

```
1  <Message>xmlns="http://namespaces.grandcentral.com/messages/env-v01"
2  >type="response">
3     <Header>
4        <Token>value="84e309b38c56a18cb9835203"/>
5        <From>
6           <Service>name="xpandico/zipPlus4"/>
7        </From>
8     </Header>
9     <Body>
10       <Document>id="xfm-doc">content-type="text/xml">encoding="none">
11          <PurchaseOrder>xmlns="http://www.estandards.org/PurchaseOrderRequest">
12             <POId>89987</POId>
13             <Item>type="SKU">3456-76987-34</Item>
14             <Quantity>2</Quantity>
15             <CustomerID>3489</CustomerID>
16             <Address>
17                <Street>31>Ocean>Front>Way</Street>
18                <City>SomeCity,>AK</City>
19                <Zip>10984-0673</Zip>
20             </Address>
21          </PurchaseOrder>
22       </Document>
23    </Body>
24 </Message>
```

APPENDIX B.4—MESSAGE AS DELIVERED TO THE ACME COMPANY

```
1  <Message>xmlns="http://namespaces.grandcentral.com/messages/env-v01"
2  >type="request">
3     <Header>
4        <Session>id="34b9f6d0-89eb-b5e1-0022-a376bf41c165"/>
5        <Token>value="30c481b28ad6e87b09f62182"/>
6        <To>
7           <Service>gcid="789e3223d9017f45"name="TheAcmeCompany/Supply">
8              <Arguments>
9                 <![CDATA[action=ProcessPurchaseOrder]]>
10             </Arguments>
11          </Service>
12       </To>
13       <From>
14          <Service>gcid="386b4520f489c217">name="mybiz.com"/>
15       </From>
16    </Header>
17    <Body>
18       <Document>id="doc-3">content-type="text/xml">encoding="none">
19          <PurchaseOrder>xmlns="http://www.estandards.org/PurchaseOrderRequest">
20             <POId>89987</POId>
```

-continued

```
21            <Item>type="SKU">3456-76987-34</Item>
22            <Quantity>2</Quantity>
23            <CustomerID>BX0045012</CustomerID>
24            <Address>
25               <Street>31>Ocean>Front>Way</Street>
26               <City>SomeCity,>AK</City>
27               <Zip>10984-0673</Zip>
28            </Address>
29         </PurchaseOrder>
30      </Document>
31   </Body>
32 </Message>
```

APPENDIX B.5—RESPONSE MESSAGE TO MYBIZ.COM AS POSTED BY THE ACME COMPANY

```
1   <Message>xmlns="http://namespaces.grandcentral.com/messages/env-v01"
2   >type="response">
3      <Header>
4         <Token>value="30c481b28ad6e87b09f62182"/>
5         <From>
6            <Service>name="TheAcmeCompany/Supply"/>
7         </From>
8      </Header>
9      <Body>
10        <Document>id="resp_doc">content-type="text/xml">encoding="base64">
11           zsl34rkuwkloirlmnm5loli2smn7fslk7ui88u98wq7rsdolikjhdf1oi9rkjjf
12        </Document>
13     </Body>
14 </Message>
```

What is claimed:

1. A method comprising:
   authenticating, by a message routing system, an entity having an account with an application service provider;
   generating, by the message routing system, an authentication token for the entity, the authentication token indicating authentication of the entity by the message routing system;
   receiving, by the message routing system, a selection of the application service provider from a directory that includes a plurality of application service providers accessible via the message routing system;
   responsive to receiving the selection, transmitting, by the message routing system, the authentication token to the application service provider;
   directing, by the message routing system, the entity to the application service provider; and
   responsive to transmitting the authentication token to the application service provider, directing the entity to the application service provider, and the entity providing authentication credentials associated with the account to the applications service provider as part of associating the authentication token with the account, receiving, by the message routing system from the application service provider, a message indicating that the application service provider accepts the authentication token, the authentication token accepted by the application service provider as a substitute for the authentication credentials associated with the account.

2. The method of claim 1, further comprising:
   expiring the authentication token in response to not receiving the message within a set time period after initiating the generation of the authentication token.

3. The method of claim 1, further comprising:
   maintaining, by the message routing system, a mapping between the authentication token and the account;
   receiving, by the message routing system from the entity, an additional message that includes the authentication token; and
   transmitting, by the message routing system, the additional message to the application service provider, the additional message including an identifier associated with the account, the identifier identified based on the mapping.

4. The method of claim 1, wherein the application service provider maintains a mapping between the authentication token and the account.

5. The method of claim 1, wherein the authentication token is an eight byte hex number.

6. The method of claim 1, further comprising:
   receiving, by the message routing system, an additional message destined for the application service provider and including the authentication token;
   authenticating, by the message routing system, the additional message based on the authentication token; and
   transmitting, by the message routing system, the additional message to the application service provider, the application service provider authenticating the additional message in association with account based on the authentication token.

7. A method comprising:
   authenticating, by a message routing system, an entity having an account with an application service provider;
   generating, by the message routing system, an authentication token for the entity, the authentication token indicating authentication of the entity by the message routing system;

transmitting, by the message routing system, the authentication token to the application service provider;
receiving, by the message routing system, a first message indicating that the application service provider accepts the authentication token, the authentication token accepted by the application service provider as a substitute for the authentication credentials associated with the account;
receiving, by the message routing system, a second message destined for the application service provider and including the authentication token;
authenticating, by the message routing system, the second message based on the authentication token; and
transmitting, by the message routing system, the second message to the application service provider, the application service provider authenticating the second message in association with the account based on the authentication token.

8. The method of claim 7, wherein the authentication token is an eight byte hex number.

9. The method of claim 7, further comprising:
expiring the authentication token in response to not receiving the message within a set time period after initiating the generation of the authentication token.

10. The method of claim 7, further comprising:
maintaining, by the message routing system, a mapping between the authentication token and the account;
receiving, by the message routing system from the entity, an additional message that includes the authentication token; and
transmitting, by the message routing system, the additional message to the application service provider, the additional message including an identifier associated with the account, the identifier identified based on the mapping.

11. The method of claim 7, wherein the application service provider maintains a mapping between the authentication token and the account.

12. A computer program product comprising a non-transitory computer-readable storage medium containing computer program instructions which when executed by one or more processors cause the one or more processors to perform operations comprising:
authenticating, by a message routing system, an entity having an account with an application service provider;
generating, by the message routing system, an authentication token for the entity, the authentication token indicating authentication of the entity by the message routing system;
receiving, by the message routing system, a selection of the application service provider from a directory that includes a plurality of application service providers accessible via the message routing system;
responsive to receiving the selection, transmitting, by the message routing system, the authentication token to the application service provider; and
responsive to the entity providing authentication credentials associated with the account to the applications service provider, receiving, by the message routing system, a message indicating that the application service provider accepts the authentication token, the authentication token accepted by the application service provider as a substitute for the authentication credentials associated with the account.

13. The computer program product of claim 12, wherein the computer program instructions are further for:
expiring the authentication token in response to not receiving the message within a set time period after initiating the generation of the authentication token.

14. The computer program product of claim 12, wherein the computer program instructions are further for:
maintaining, by the message routing system, a mapping between the authentication token and the account;
receiving, by the message routing system from the entity, an additional message that includes the authentication token; and
transmitting, by the message routing system, the additional message to the application service provider, the additional message including an identifier associated with the account, the identifier identified based on the mapping.

15. The computer program product of claim 12, wherein the application service provider maintains a mapping between the authentication token and the account.

16. The computer program product of claim 12, wherein the computer program instructions are further for:
receiving, by the message routing system, an additional message destined for the application service provider and including the authentication token;
authenticating, by the message routing system, the message based on the authentication token; and
transmitting, by the message routing system, the additional message to the application service provider, the application service provider authenticating the additional message in association with account based on the authentication token.

17. The computer program product of claim 12, wherein the authentication token is an eight byte hex number.

18. A computer program product comprising a non-transitory computer-readable storage medium containing computer program instructions which when executed by one or more processors cause the one or more processors to perform operations comprising:
authenticating, by a message routing system, an entity having an account with an application service provider;
generating, by the message routing system, an authentication token for the entity, the authentication token indicating authentication of the entity by the message routing system;
receiving, by the message routing system, a selection of the application service provider from a directory that includes a plurality of application service providers accessible via the message routing system; and
responsive to receiving the selection, transmitting, by the message routing system, the authentication token to the application service provider;
directing, by the message routing system, the entity to the application service provider; and
responsive to transmitting the authentication token to the application service provider, directing the entity to the application service provider, and the entity providing authentication credentials associated with the account to the applications service provider as part of associating the authentication token with the account, receiving, by the message routing system from the application service provider, a message indicating that the application service provider accepts the authentication token, the authentication token accepted by the application service provider as a substitute for the authentication credentials associated with the account.

19. The computer program product of claim 18, wherein the computer program instructions are further for:

expiring the authentication token in response to not receiving the message within a set time period after initiating the generation of the authentication token.

20. The computer program product of claim 18, wherein the computer program instructions are further for:

maintaining, by the message routing system, a mapping between the authentication token and the account;

receiving, by the message routing system from the entity, an additional message that includes the authentication token; and transmitting, by the message routing system, the additional message to the application service provider, the additional message including an identifier associated with the account, the identifier identified based on the mapping.

* * * * *

UNITED STATES PATENT AND TRADEMARK OFFICE
CERTIFICATE OF CORRECTION

PATENT NO. : 9,948,644 B2  
APPLICATION NO. : 14/805307  
DATED : April 17, 2018  
INVENTOR(S) : Lev Brouk et al.

Page 1 of 1

It is certified that error appears in the above-identified patent and that said Letters Patent is hereby corrected as shown below:

In the Claims

Column 32, Line 59, "association with account" to read as --association with an account--

Column 33, Lines 6-7, "as a substitute for the authentication credentials" to read as --as a substitute for authentication credentials--

Column 34, Line 30, "with account based" to read as --with an account based--

Signed and Sealed this
Twenty-fourth Day of September, 2019

Andrei Iancu
*Director of the United States Patent and Trademark Office*